(12) United States Patent
Yu et al.

(10) Patent No.: US 10,555,128 B2
(45) Date of Patent: Feb. 4, 2020

(54) METHOD FOR TRANSMITTING POSITIONING ASSISTANCE DATA AND DEVICE

(71) Applicant: Huawei Technologies Co., Ltd., Shenzhen, Guangdong (CN)

(72) Inventors: Yinghui Yu, Beijing (CN); Chenwan Li, Beijing (CN); Zhe Jin, Beijing (CN); Yiling Wu, Beijing (CN); Zhe Chen, Shenzhen (CN); Weiliang Zhang, Shanghai (CN); Zhihu Luo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/369,386

(22) Filed: Mar. 29, 2019

(65) Prior Publication Data

US 2019/0230477 A1    Jul. 25, 2019

Related U.S. Application Data

(63) Continuation of application No. PCT/CN2017/081897, filed on Apr. 25, 2017.

(30) Foreign Application Priority Data

Sep. 30, 2016 (WO) ............... PCT/CN2016/101403

(51) Int. Cl.
*H04W 4/029* (2018.01)
*H04W 4/06* (2009.01)

(52) U.S. Cl.
CPC ............ *H04W 4/029* (2018.02); *H04W 4/06* (2013.01)

(58) Field of Classification Search
CPC ................................ H04W 4/029; H04W 4/06
(Continued)

(56) References Cited

U.S. PATENT DOCUMENTS 8,174,438 B2 * 5/2012 Fan ...................... G01S 5/0072
                                                    342/357.42
8,909,239 B2 * 12/2014 Edge ...................... H04W 4/06
                                                    455/450
(Continued)

FOREIGN PATENT DOCUMENTS

CN         101658013 A     2/2010
CN         101877818 A    11/2010
(Continued)

*Primary Examiner* — William Nealon
(74) *Attorney, Agent, or Firm* — Slater Matsil, LLP

(57) ABSTRACT

Embodiments of this application provide a method for transmitting positioning assistance data and a device. The method includes: receiving, by a network device, at least one positioning assistance data message sent by a positioning server, where the at least one positioning assistance data message is used to carry positioning assistance data; and broadcasting, by the network device, a system message to a terminal device, where the system message is used by the terminal device to obtain the positioning assistance data. According to the embodiments of this application, the network device broadcasts the system message to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

15 Claims, 8 Drawing Sheets

(58) Field of Classification Search
USPC .................................................. 455/456.1
See application file for complete search history.

(56) References Cited

U.S. PATENT DOCUMENTS

| | | | | |
|---|---|---|---|---|
| 9,116,228 | B2* | 8/2015 | Ellum | G01S 19/04 |
| 2008/0228654 | A1* | 9/2008 | Edge | G01S 19/48 |
| | | | | 705/71 |
| 2011/0032859 | A1 | 2/2011 | Wirola et al. | |
| 2011/0306362 | A1* | 12/2011 | Huang | H04W 4/02 |
| | | | | 455/456.1 |
| 2013/0252630 | A1 | 9/2013 | Edge et al. | |
| 2013/0293412 | A1* | 11/2013 | Appleford | G01S 19/04 |
| | | | | 342/357.23 |
| 2014/0378170 | A1 | 12/2014 | Rudow et al. | |
| 2015/0072708 | A1 | 3/2015 | Lim et al. | |
| 2016/0029162 | A1 | 1/2016 | Edge et al. | |

FOREIGN PATENT DOCUMENTS

| | | |
|---|---|---|
| CN | 101888587 A | 11/2010 |
| CN | 102007425 A | 4/2011 |
| CN | 102137332 A | 7/2011 |
| CN | 103713302 A | 4/2014 |
| CN | 103765927 A | 4/2014 |
| WO | 2007040375 A1 | 4/2007 |

* cited by examiner

METHOD FOR TRANSMITTING POSITIONING ASSISTANCE DATA AND DEVICE

CROSS-REFERENCE TO RELATED APPLICATIONS

This application is a continuation of International Application No. PCT/CN2017/081897, filed on Apr. 25, 2017, which claims priority to International Patent Application No. PCT/CN2016/101403, filed on Sep. 30, 2016. The disclosures of the aforementioned applications are hereby incorporated by reference in their entireties.

TECHNICAL FIELD

Embodiments of this application relate to the communications field, and in particular, to a method for transmitting positioning assistance data and a device.

BACKGROUND

In an existing 3rd Generation Partnership Project (3GPP) positioning technology, a point-to-point protocol is usually used to support a positioning service. For example, the point-to-point protocol is the Long Term Evolution Positioning Protocol (LPP). In the LPP protocol, a positioning server provides positioning assistance data for a terminal device in point-to-point unicast mode.

In a scenario in which there are a large quantity of connections or a large quantity of positioning requests, using the solution of transmitting the positioning assistance data in point-to-point unicast mode causes relatively low efficiency of transmitting the positioning assistance data.

Therefore, how to improve the efficiency of transmitting the positioning assistance data has become a problem that urgently needs to be resolved.

SUMMARY

Embodiments of this application provide a method for transmitting positioning assistance data, a network device, a positioning server, and a terminal device. The method can improve efficiency of transmitting positioning assistance data.

According to a first aspect, a method for transmitting positioning assistance data is provided. The method includes:

receiving, by a network device, at least one positioning assistance data message sent by a positioning server, where the at least one positioning assistance data message is used to carry positioning assistance data; and broadcasting, by the network device to a terminal device, a system message carrying at least one first parameter, where each first parameter is used by the terminal device to detect first indication information at a first resource location, and the first indication information is used to indicate a second resource location at which the network device is to send the positioning assistance data.

Therefore, in this embodiment of this application, the network device broadcasts the message to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

In an implementation of the first aspect, the method further includes:

sending, by the network device, the first indication information at the first resource location; and sending, by the network device, the positioning assistance data at the second resource location.

Therefore, in this embodiment of this application, the network device sends the positioning assistance data to the terminal device by using three steps. First parameter information having a relatively small data volume may be added to the system message to reduce a size of the system message. In addition, the first indication information may be detected on a predefined resource by using the first parameter, to reduce signaling overheads on a second resource. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

For example, when a positioning assistance data packet is relatively small, the positioning server may send a positioning assistance data message to the network device, where the positioning assistance data message carries the positioning assistance data.

Therefore, in this embodiment of this application, the positioning assistance data can be sent by using only one positioning assistance data message, thereby reducing signaling overheads and providing system performance.

In an implementation of the first aspect, when the positioning assistance data includes at least two pieces of positioning assistance subdata, that the at least one positioning assistance data message is used to carry positioning assistance data includes:

each positioning assistance data message carries one piece of positioning assistance subdata.

For example, when a positioning assistance data packet is relatively large, the positioning server may send N positioning assistance data messages to the network device, where N is an integer greater than or equal to 2, and the N positioning assistance data messages are used to carry the positioning assistance data.

Specifically, the positioning assistance data may include N pieces of positioning assistance subdata, and the positioning assistance data message includes N positioning assistance subdata messages.

The receiving, by a network device, a positioning assistance data message sent by a positioning server includes:

receiving, by the network device, the N positioning assistance subdata messages sent by the positioning server, where each of the N positioning assistance subdata messages carries one of the N pieces of positioning assistance subdata.

It should be understood that in this embodiment of this application, data volumes of the N pieces of positioning assistance subdata may be approximately equal or may not be equal. The positioning server may determine an amount of each piece of positioning assistance subdata depending on an actual situation. This is not limited in this embodiment of this application.

Therefore, in this embodiment of this application, when the positioning assistance data is relatively large, the positioning assistance data may be sent by using a plurality of positioning assistance data messages, to avoid generation of an excessively large message. In addition, when transmission of a positioning assistance data message fails, only the positioning assistance data message of which transmission fails needs to be retransmitted, thereby reducing a quantity of data retransmissions and improving system performance.

For example, the first parameter is used by the terminal device to detect second indication information at the first resource location, and the second indication information is used to instruct the network device to transmit a third resource location for sending the positioning assistance data.

Specifically, the first parameter may be a positioning radio network temporary identifier (RNTI), the second resource location may be a location of a physical downlink control channel (PDCCH) resource, the second indication information may be downlink control information (DCI) borne on the PDCCH, and the third resource location may be a location of a physical downlink shared channel (PDSCH) resource. The PDCCH may be a PDCCH resource in one of the foregoing plurality of network systems to which this embodiment of this application can be applied. The PDSCH may be a PDSCH resource in one of the foregoing plurality of network systems to which this embodiment of this application can be applied.

It should be noted that the at least one first parameter in this embodiment of this application may include one parameter or may include a plurality of parameters. For example, the first parameter may include a plurality of (groups of) positioning RNTIs, and each (group of) positioning RNTI corresponds to one positioning method or one mode of one positioning method. For example, a positioning RNTI 1 corresponds to an OTDOA method, and a positioning RNTI 2 corresponds to an A-GNSS method.

When the first parameter in this embodiment of this application includes one (group of) positioning RNTI, the terminal completes subsequent receiving by using the (group of) obtained positioning RNTI. The (group of) positioning RNTI corresponds to one positioning method, for example, an OTDOA cellular positioning method or GPS satellite positioning.

When the first parameter in this embodiment of this application includes two (groups of) positioning RNTIs, the terminal completes subsequent receiving by using the obtained two (groups of) different positioning RNTIs. The two (groups of) different positioning RNTIs correspond to two different positioning methods, for example, OTDOA and GPS satellite positioning.

When the first parameter in this embodiment of this application includes two (groups of) positioning RNTIs, the terminal completes subsequent receiving by using the obtained two (groups of) different positioning RNTIs. The two (groups of) different positioning RNTIs correspond to two different modes of one positioning method, for example, GPS satellite positioning and BeiDou satellite positioning.

When the first parameter in this embodiment of this application includes three (groups of) positioning RNTIs, the terminal completes subsequent receiving by using the obtained three (groups of) different positioning RNTIs. The three (groups of) different positioning RNTIs correspond to two positioning methods and two different modes of one of the two positioning methods, for example, OTDOA cellular positioning, GPS satellite positioning, and BeiDou satellite positioning.

Specifically, each positioning RNTI corresponds to one PDCCH resource, and DCI borne on the PDCCH resource indicates a PDSCH resource bearing a corresponding positioning assistance data.

Herein, the grouping may be performed according to different positioning methods, different modes corresponding to a positioning method, or a combination thereof. This embodiment of this application is not limited thereto.

Optionally, before the receiving, by a network device, a positioning assistance data message sent by a positioning server, the method further includes:

receiving, by the network device, a request message sent by the positioning server, where the request message is used to request the network device to forward the positioning assistance data; and sending, by the network device, a response acknowledgement message to the positioning server, where the response acknowledgement message is used to indicate whether the network device accepts forwarding of the positioning assistance data.

The receiving, by a network device, a positioning assistance data message sent by a positioning server includes:

when the response acknowledgement message is used to indicate that the network device accepts forwarding of the positioning assistance data, receiving, by the network device, the positioning assistance data message sent by the positioning server.

Therefore, in this embodiment of this application, the positioning server can send the positioning assistance data to the network device only when the request is accepted. Compared with a case in which there is no request, a response of the network device can be received when the request is not accepted, thereby avoiding unnecessary transmission and avoiding a waste of resources.

Alternatively, when the response acknowledgement message is used to indicate that the network device rejects forwarding of the positioning assistance data, the positioning server may send the positioning assistance data to the terminal device in unicast mode according to the solution in the prior art.

Therefore, in this embodiment of this application, even though the forwarding request of the positioning server is not accepted, the positioning assistance data may be sent to the terminal device in existing unicast mode, to improve compatibility of the method in this embodiment of this application.

In an implementation of the first aspect, the positioning assistance data includes differential satellite positioning assistance data, and before the receiving, by a network device, a positioning assistance data message sent by a positioning server, the method further includes:

receiving, by the network device, a positioning information request message sent by the positioning server, where the positioning request message is used to request to obtain device information of the network device, and the device information includes at least one of the following information: location information of the network device and identification information of the network device; and sending, by the network device, a positioning information response message to the positioning server, where the positioning response message carries the device information.

In an implementation of the first aspect, the positioning assistance data message is a Long Term Evolution Positioning Protocol LPPa message.

Optionally, the positioning request message and the positioning response message may also be a Long Term Evolution Positioning Protocol LPPa message.

Therefore, in this embodiment of this application, the network device broadcasts the message to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

According to a second aspect, a method for transmitting positioning assistance data is provided. The method includes:

receiving, by a network device, at least one positioning assistance data message sent by a positioning server, where the at least one positioning assistance data message is used to carry positioning assistance data; and broadcasting, by the network device to a terminal device, a system message carrying the positioning assistance data.

Therefore, in this embodiment of this application, the network device broadcasts the message to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

According to a third aspect, a method for transmitting positioning assistance data is provided. The method includes:

receiving, by a network device, at least one positioning assistance data message sent by a positioning server, where the at least one positioning assistance data message is used to carry positioning assistance data; and broadcasting, by the network device to a terminal device, a system message carrying second indication information, where the second indication information is used to instruct the network device to transmit a third resource location for sending the positioning assistance data.

Optionally, in an implementation of the third aspect, the network device sends the positioning assistance data at the third resource location.

Therefore, in this embodiment of this application, the network device sends the positioning assistance data to the terminal device by using two steps. The second indication information having a relatively small data volume may be added to the system message to reduce a size of the system message. In addition, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

According to a fourth aspect, a method for transmitting positioning assistance data is provided. The method includes:

obtaining, by a positioning server, positioning assistance data; and sending, by the positioning server, at least one positioning assistance data message to a network device, where the at least one positioning assistance data message is used to carry the positioning assistance data, the positioning assistance data message is used to trigger the network device to broadcast a system message to a terminal device, the broadcast system message carries at least one first parameter, each first parameter is used by the terminal device to detect first indication information at a first resource location, and the first indication information is used to instruct the network device to send a second resource location of the positioning assistance data.

Therefore, in this embodiment of this application, the positioning server sends the positioning assistance data to the network device, and triggers the network device to broadcast the system message to the terminal device, to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

In an implementation of the fourth aspect, when the positioning assistance data includes at least two pieces of positioning assistance subdata, that the at least one positioning assistance data message is used to carry the positioning assistance data includes:

each positioning assistance data message carries one piece of positioning assistance subdata.

It should be understood that the fourth aspect corresponds to the first aspect, the first aspect is performed by the network device, and the fourth aspect may be performed by the positioning server device. For corresponding features of the method on a side of the positioning server, refer to corresponding descriptions of the method on a side of the network device in the first aspect. Therefore, for brevity, details are properly omitted.

In an implementation of the fourth aspect, before the sending, by the positioning server, a positioning assistance data message to a network device, the method further includes:

sending, by the positioning server, a request message to the network device, where the request message is used to request the network device to forward the positioning assistance data; and receiving, by the positioning server, a response acknowledgement message sent by the network device, where the response acknowledgement message is used to indicate whether the network device accepts forwarding of the positioning assistance data.

In an implementation of the fourth aspect, the positioning assistance data includes differential satellite positioning assistance data, and before the receiving, by a network device, a positioning assistance data message sent by a positioning server, the method further includes:

receiving, by the network device, a positioning information request message sent by the positioning server, where the positioning request message is used to request to obtain device information of the network device, and the device information includes at least one of the following information: location information of the network device and identification information of the network device; and sending, by the network device, a positioning information response message to the positioning server, where the positioning response message carries the device information.

In an implementation of the fourth aspect, the positioning assistance data message is a Long Term Evolution Positioning Protocol LPPa message.

Optionally, the positioning request message and the positioning response message may also be a Long Term Evolution Positioning Protocol LPPa message.

According to a fifth aspect, a method for transmitting positioning assistance data is provided. The method includes:

obtaining, by a positioning server, positioning assistance data; and sending, by the positioning server, at least one positioning assistance data message to a network device, where the at least one positioning assistance data message is used to carry the positioning assistance data, the positioning assistance data message is used to trigger the network device to broadcast a system message to a terminal device, the system message carries second indication information, the second indication information is used to instruct the network device to transmit a third resource location for sending the positioning assistance data, and the third resource location bears the positioning assistance data sent by the network device.

Therefore, in this embodiment of this application, the network device sends the positioning assistance data to the terminal device by using two steps. The second indication information having a relatively small data volume may be added to the system message to reduce a size of the system message. In addition, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

According to a sixth aspect, a method for transmitting positioning assistance data is provided. The method includes:

obtaining, by a positioning server, positioning assistance data; and sending, by the positioning server, at least one positioning assistance data message to a network device, where the at least one positioning assistance data message is used to carry the positioning assistance data, the positioning assistance data message is used to trigger the network device to broadcast a system message to a terminal device, and the system message carries the positioning assistance data.

Therefore, in this embodiment of this application, the network device broadcasts the message to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

According to a seventh aspect, a method for transmitting positioning assistance data is provided. The method includes:

receiving, by a terminal device, a system message that is broadcast by a network device and that carries at least one first parameter;

detecting, by the terminal device, a first indication message at a first resource location based on the first parameter, where the first indication information is used to indicate a second resource location at which the network device is to send positioning assistance data; and obtaining, by the terminal device, the positioning assistance data based on the second resource location indicated by the first indication information.

Optionally, the positioning assistance data includes differential satellite positioning assistance data.

Therefore, in this embodiment of this application, the positioning server sends the positioning assistance data to the network device, and triggers the network device to broadcast the system message to the terminal device, to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

According to an eighth aspect, a method for transmitting positioning assistance data is provided. The method includes:

receiving, by the terminal device, a system message that is broadcast by a network device and that carries second indication information, where the second indication information is used to instruct the network device to transmit a third resource location for sending the positioning assistance data; and obtaining, by the terminal device, the positioning assistance data based on the third resource location indicated by the second indication information.

Therefore, in this embodiment of this application, the network device sends the positioning assistance data to the terminal device by using two steps. The second indication information having a relatively small data volume may be added to the system message to reduce a size of the system message. In addition, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

According to a ninth aspect, a method for transmitting positioning assistance data is provided. The method includes:

receiving, by the terminal device, a system message that is broadcast by a network device and that carries positioning assistance data; and obtaining, by the terminal device, the positioning assistance data based on the system information.

Therefore, in this embodiment of this application, the network device broadcasts the message to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

Optionally, in any optional implementation of the first to the ninth aspects, the positioning assistance data may be observed time difference of arrival OTDOA positioning assistance data, correction data, ephemeris data, or real-time kinematic RTK data.

The positioning assistance data may be RTK data, ephemeris data, RTK correction data or correction data, and other data transmitted by using a differential signal format (RTCM). The embodiments of this application are not limited thereto.

In the embodiments of this application, the positioning assistance data may be transmitted by using a differential signal format (RTCM). For example, after obtaining the positioning assistance data, a reference station transmits the positioning assistance data to an RTK server by using the RTCM transmission format.

Optionally, the positioning server may obtain the positioning assistance data from the RTK positioning server. The positioning server may send the positioning assistance data to the network device by using an MME, or may send the positioning assistance data to the network device by using an LPPa message. The embodiments of this application are not limited thereto.

It should be understood that the positioning server may further receive at least one of the following information sent by the RTK positioning server:

an identifier of the network device (for example, a target eNodeB identifier (Target eNB ID)), a cell identifier (Cell ID) of the terminal device, an area identifier (Area ID) of the terminal device, a transmission procedure identifier (transaction ID)/a service identifier, a quality of service QoS requirement of the RTK data, and a data transmission rate of the positioning assistance data obtained by the RTK server. Specifically, the RTK server may send the information to the positioning server by using an interface message.

It should be understood that the interface message in the embodiments of this application may further be used to transmit other information. That is, a message transmitted through an interface between the RTK server and the positioning server is not limited thereto.

It should be noted that usage of the information is not limited in the embodiments of this application. For example, the positioning server may determine, based on the information, the network device, a cell in which the terminal device is located, the terminal device, or the like. The embodiments of this application are not limited thereto. Optionally, the positioning server may obtain the information separately. That is, the positioning server may obtain only the information, and does not obtain the positioning assistance data. In this case, the positioning server may perform positioning analysis based on the obtained information or use the obtained information for another purpose. This is not limited in the embodiments of this application.

According to a tenth aspect, a network device is provided. The network device is configured to perform the method according to any possible implementation of the first to the third aspects. Specifically, the network device includes a unit configured to perform the foregoing method.

According to an eleventh aspect, a positioning server is provided. The positioning server is configured to perform the method according to any possible implementation of the fourth to the sixth aspects. Specifically, the positioning server includes a unit configured to perform the foregoing method.

According to a twelfth aspect, a terminal device is provided. The terminal device is configured to perform the method according to any possible implementation of the seventh to the ninth aspects. Specifically, the terminal device includes a unit configured to perform the foregoing method.

According to a thirteenth aspect, a network device is provided. The network device includes a processor and a memory. The memory is configured to store a computer program, and the processor is configured to perform the computer program stored in the memory, to perform the method according to any possible implementation of the first to the third aspects.

According to a fourteenth aspect, a positioning server is provided. The positioning server includes a processor and a memory. The memory is configured to store a computer program, and the processor is configured to perform the computer program stored in the memory, to perform the method according to any possible implementation of the fourth to the sixth aspects.

According to a fifteenth aspect, a terminal device is provided. The terminal device includes a processor and a memory. The memory is configured to store a computer program, and the processor is configured to perform the computer program stored in the memory, to perform the method according to any possible implementation of the seventh to the ninth aspects.

According to a sixteenth aspect, a computer readable medium is provided, and is configured to store a computer program. The computer program includes an instruction used to perform the method according to any possible implementation of the first to the third aspects.

According to a seventeenth aspect, a computer readable medium is provided, and is configured to store a computer program. The computer program includes an instruction used to perform the method according to any possible implementation of the fourth to the sixth aspects.

According to an eighteenth aspect, a computer readable medium is provided, and is configured to store a computer program. The computer program includes an instruction used to perform the method according to any possible implementation of the seventh to the ninth aspects.

According to a nineteenth aspect, a computer program product is provided. When being executed by a computer, the computer program product is configured to implement the method according to any possible implementation of the first to the third aspects.

According to a twentieth aspect, a computer program product is provided. When being executed by a computer, the computer program product is configured to implement the method according to any possible implementation of the fourth to the sixth aspects.

According to a twenty-first aspect, a computer program product is provided. When being executed by a computer, the computer program product is configured to implement the method according to any possible implementation of the seventh to the ninth aspects.

DESCRIPTION OF EMBODIMENTS

The following clearly describes the technical solutions in the embodiments of this application with reference to the accompanying drawings in the embodiments of this application.

The embodiments of this application may be applied to various communications systems. Therefore, the following descriptions are not limited to a particular communications system. For example, the embodiments of this application may be applied to a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), an NB-IoT system, and the like.

Figure 1:
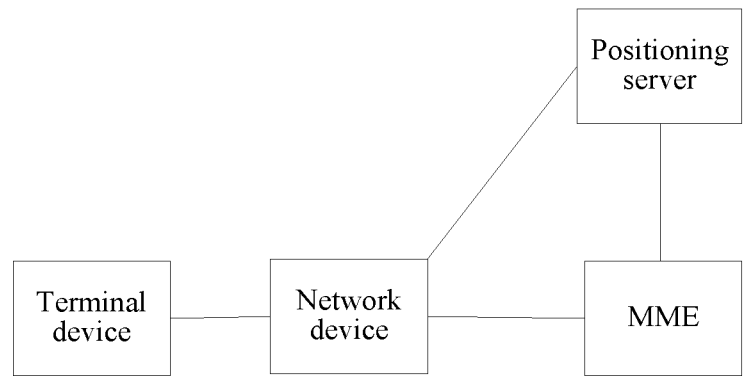
FIG. 1 is a schematic diagram of a system scenario to which an embodiment of this application can be applied.

FIG. 1 is a schematic diagram of a system scenario to which an embodiment of this application can be applied. Network elements included in the system scenario shown in FIG. 1 may include a terminal device, a network device, a positioning server, and a mobility management entity (MME).

In this embodiment of this application, the MME may be a control node for processing signaling interaction between the terminal device and a core network. For example, the MME may transfer or forward information between the network device and the positioning server.

In this embodiment of this application, the terminal device is an entity having a sending or receiving function, and the terminal device may also be referred as to user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

In this embodiment of this application, the network device is an entity having a sending or receiving function, and the network device may be a device such as a network side device configured to communicate with a mobile device. The network side device may be an existing cellular base station, or may be a cellular base station provided with a satellite reference station. For example, the network device may be a base transceiver station (BTS) in Global System of Mobile communication (GSM) or Code Division Multiple Access (CDMA); or may be an NB (NodeB, NodeB) in Wideband Code Division Multiple Access (WCDMA); or may be an eNB or evolved NodeB (eNodeB) in Long Term Evolution (LTE), a relay station or an access point, an in-vehicle device, a wearable device, or a network side device in a future 5G network.

In this embodiment of this application, the positioning server may be a positioning server, for example, an enhanced serving mobile location center (E-SMLC) or an SUPL location platform (SLP), and responsible for managing coordination and scheduling of all resources required for finding a location of UE attached to an E-UTRAN. Based on a received positioning measurement estimation value, a final location is computed, and a speed, location information, and the like of the UE are estimated.

Figure 2:
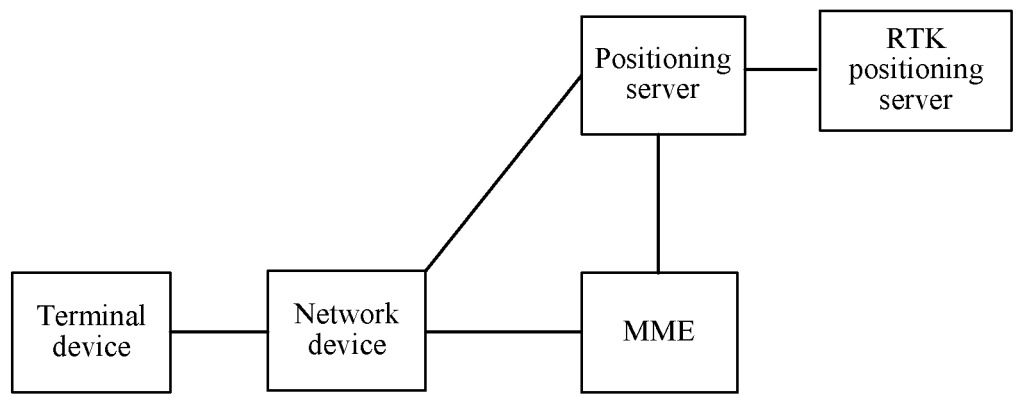
FIG. 2 is a schematic diagram of a system scenario to which an embodiment of this application can be applied.

FIG. 2 is a schematic diagram of a system scenario to which an embodiment of this application can be applied. Network elements included in the system scenario shown in FIG. 2 may include a terminal device, a network device, a positioning server, a mobility management entity (MME), and a real-time kinematic (RTK) positioning server.

Compared with the scenario in FIG. 1, in the scenario shown in FIG. 2, in the system, the positioning server may communicate with the RTK server, and the positioning server may obtain positioning assistance data from the RTK server.

For the network elements in FIG. 2, refer to descriptions of same network elements in FIG. 1. To avoid repetition, details are not described herein again.

Specifically, in the system scenario shown in FIG. 1, when the terminal device needs to be positioned, the positioning server receives a positioning request used to request to position the terminal device. The positioning request may be sent by the terminal device, the network device, the MME, or another core network or access network device. After receiving the positioning request, the positioning server processes the request, and sends positioning assistance data to the terminal device. The terminal device performs measurement based on the positioning assistance data, to obtain a positioning measurement estimation value (measurement data). Then, the terminal device reports the positioning measurement estimation value to the positioning server. The positioning server computes a final location of the terminal device based on the received positioning measurement estimation value, and can also estimate information about, for example, a speed of, the terminal device.

It should be understood that positioning methods that can be applied to this embodiment of this application include observed time difference of arrival (OTDOA) positioning, uplink time difference of arrival (UTDOA) positioning, A-GNSS positioning, E-CID positioning, air pressure sensor positioning, TBS positioning, WLAN positioning, Bluetooth positioning, and the like. The A-GNSS may include a high-precision differential GNSS method, for example, differential satellite positioning methods such as RTD (Real-time Differential), RTK (Real-time Kinematic), and network RTK (Network Real-time Kinematic). This embodiment of this application is not limited thereto.

Figure 3:
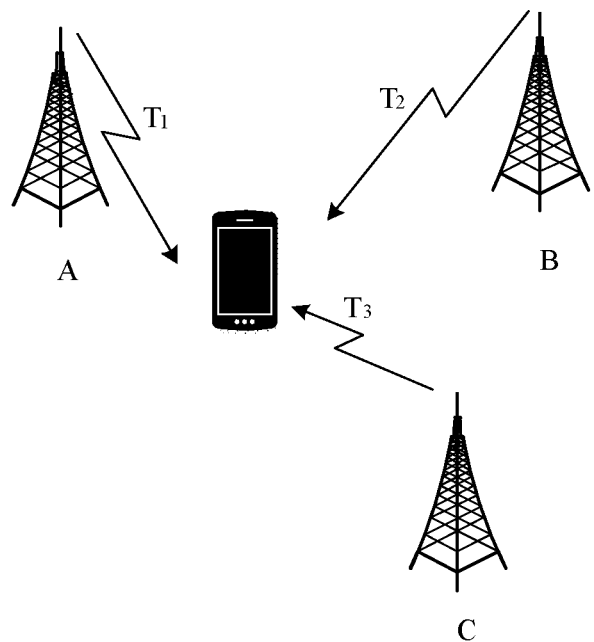
FIG. 3 is a schematic diagram of a scenario in which a terminal device measures positioning data.

For example, using the OTDOA as an example, the positioning server positions the terminal device based on a reference signal time difference that is between a neighboring cell and a serving cell and that is observed by a receiver of the terminal device. Specifically, as shown in FIG. 3, after receiving the positioning assistance data sent by the positioning server, the terminal device may perform measurement based on the positioning assistance data, to obtain the positioning measurement estimation value. The measurement data may be time points that are of reference signals of the neighboring cell and the serving cell and that are observed by the receiver of the terminal device. For example, obtained time points of cells A, B, and C are T1, T2, and T3 respectively. Alternatively, the measurement data may be the reference signal time difference that is between the neighboring cell and the serving cell and that is observed by the receiver of the terminal device. Then, the terminal device reports the measurement data to the positioning server. Further, the positioning server may compute the location information, the speed information, or the like of the terminal device based on the measurement data. In the methods, the OTDOA-based location estimation method needs to be performed based on a time difference between at least two pairs of cells.

However, it should be noted that in an existing protocol, a positioning server needs to provide positioning assistance data to a terminal device in point-to-point unicast mode. In a scenario in which there are a large quantity of connections or a large quantity of positioning requests, using the solution of transmitting the positioning assistance data in point-to-point unicast mode causes low efficiency of transmitting the positioning assistance data.

In the scenario of FIG. 2, when positioning needs to be performed, the RTK server may obtain positioning assistance data (for example, ephemeris data or correction data) from a reference station, and send the positioning assistance data to the positioning server. Then, the positioning server needs to provide the positioning assistance data for the terminal device in point-to-point unicast mode, and the terminal device may perform positioning based on the positioning assistance data.

It should be understood that the reference station may receive a satellite signal, and may communicate with the RTK server to transmit the positioning assistance data to the RTK server. The reference station may be a base station, for example, a Qianxun reference station or another reference station. This is not limited in this embodiment of this application.

It should be understood that the RTK server in this embodiment of this application may also be referred to as a data center, a control center, a computing center, or a network processing center. The data center, the control center, the computing center, or the network processing center may be configured to compute correction data through modeling. This embodiment of this application is not limited thereto.

The problem in FIG. 1 also exists in the scenario in FIG. 2. That is, in a scenario in which there are a large quantity of connections or a large quantity of positioning requests, using the solution of transmitting the positioning assistance data in point-to-point unicast mode causes low efficiency of transmitting the positioning assistance data.

In view of this problem, the embodiments of this application skillfully provide a solution in which the network device broadcasts and forwards the positioning assistance data, so as to resolve a problem of low efficiency of transmitting existing centralized positioning assistance data.

For convenience of understanding and description, by way of example but not limitation, a process and actions of performing a method for transmitting positioning assistance data in this application in the communications system are described below.

It should be understood that positioning methods that can be applied to the embodiments of this application include OTDOA positioning, UTDOA positioning, A-GNSS positioning, E-CID positioning, air pressure sensor positioning, TBS positioning, WLAN positioning, Bluetooth positioning, and the like. The A-GNSS may include a high-precision differential GNSS method, for example, differential satellite positioning methods such as RTD (Real-time Differential), RTK (Real-time Kinematic), and network RTK (Network Real-time Kinematic). The OTDOA is used as an example for description in the following embodiments, but the embodiments of this application are not limited thereto. When another positioning method is used, corresponding interaction signaling may change correspondingly.

It should be understood that unless otherwise specially stated, a type of interaction signaling between the network device and the positioning server in the embodiments of this application may be an LPPa message. To avoid repetition, details are not further described below.

It should further be understood that same reference numerals in the accompanying drawings in the embodiments of this application represent same content. To avoid repetition, details are properly omitted below after descriptions of a same reference numeral are provided. For specific content of a reference numeral that appears again, refer to previous corresponding descriptions of the reference numeral, and details are not further described below.

It should be understood that the positioning assistance data in the embodiments of this application may include a physical cell identifier (PCI), an evolved universal terrestrial radio access network cell global identifier (ECGI), an evolved universal terrestrial radio access absolute radio frequency channel number (EARFCN), a positioning reference signal bandwidth, a cyclic prefix length, a cell-dedicated reference signal port quantity, a positioning reference signal subframe configuration (a period/an offset/a quantity of consecutive subframes), a positioning reference signal silence configuration, a cyclic prefix length, and a cell-dedicated reference signal port quantity of a reference cell; a physical cell identifier (PCI), an evolved universal terrestrial radio access network cell global identifier (ECGI), an evolved universal terrestrial radio access absolute radio frequency channel number (EARFCN), a positioning reference signal bandwidth, a positioning reference signal subframe configuration (a period/an offset/a quantity of consecutive subframes), a positioning reference signal silence configuration, a cyclic prefix length, a cell-dedicated reference signal port quantity, a subframe quantity offset, a positioning reference signal subframe offset, a search window, an expected reference signal time difference, expected reference signal time difference uncertainty, and the like of a neighboring cell; information related to a coverage level, for example, a quantity of cells needing to be measured; and differential satellite positioning assistance data based on a location of a base station, where the differential satellite positioning assistance data includes pseudorange differential, positional differential, carrier phase differential, and the like. The embodiments of this application are not limited thereto.

Figure 4:
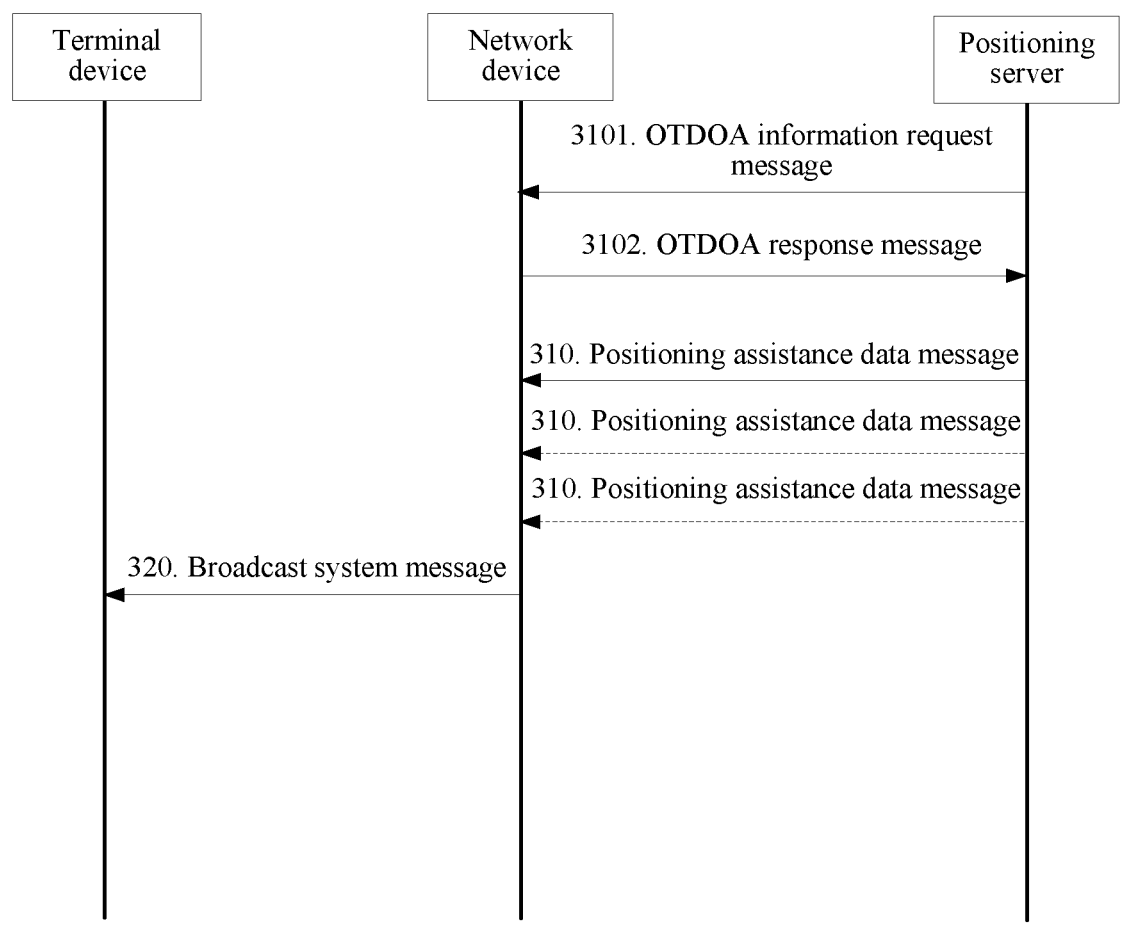
FIG. 4 is a flowchart of a method for transmitting positioning assistance data according to an embodiment of this application.

FIG. 4 is a schematic flowchart of a method for transmitting positioning assistance data according to an embodiment of this application. The method shown in FIG. 4 may be applied to the foregoing various communications systems. Specifically, the method 300 shown in FIG. 4 includes the following steps.

310. A positioning server sends at least one positioning assistance data message to a network device.

Specifically, the at least one positioning assistance data message is used to carry positioning assistance data.

For example, after obtaining a positioning request, the positioning server may send, based on a size of a positioning assistance data packet, the obtained positioning assistance data to the network device by using one or more positioning assistance data messages. The positioning server may obtain the positioning assistance data in a manner specified in an existing standard. For example, as shown in FIG. 4, before step 310, the method may further include the following steps.

3101. The positioning server sends an OTDOA information request message to the network device, where the OTDOA information request message is used to request to obtain positioning assistance data corresponding to the network device needing to perform OTDOA positioning.

3102. The network device sends an OTDOA response message to the positioning server, where the OTDOA response message carries the positioning assistance data corresponding to the network device.

It should be understood that step 3101 and step 3102 are described only by using an OTDOA positioning method as an example. When the positioning method is another positioning method, the OTDOA request message and the OTDOA response message in step 3101 and step 3102 may change correspondingly.

For example, when a UTDOA positioning method is merely used as an example, the OTDOA request message and the OTDOA response message in step 3101 and step 3102 are correspondingly changed to a UTDOA request message and a UTDOA response message.

It should be understood that in step 3101, the positioning server may alternatively send the OTDOA information request message to a network device in a neighboring cell of a cell in which the network device is located, to request to obtain positioning assistance data corresponding to the network device in the neighboring cell. Then, the positioning server may summarize positioning assistance data corresponding to a plurality of network devices to form the positioning assistance data sent by the positioning server in step 310 in FIG. 4. Specifically, for a specific process of obtaining, by the positioning server, the positioning assistance data needing to be sent, refer to a specific process in an existing standard. For brevity, details are not described herein. After obtaining the positioning assistance data, the positioning server sends the positioning assistance data to the network device by using the at least one positioning assistance data message.

For example, when a positioning assistance data packet is relatively small, the positioning server may send one positioning assistance data message to the network device, where the positioning assistance data message carries the positioning assistance data.

Therefore, in this embodiment of this application, the positioning assistance data can be sent by using only one positioning assistance data message, thereby reducing signaling overheads and providing system performance.

For another example, when a positioning assistance data packet is relatively large, the positioning server may send N positioning assistance data messages to the network device, where N is an integer greater than or equal to 2, and the N positioning assistance data messages are used to carry the positioning assistance data.

Specifically, the positioning assistance data may include N pieces of positioning assistance subdata, and the positioning assistance data message includes N positioning assistance subdata messages.

The receiving, by a network device, a positioning assistance data message sent by a positioning server includes:

receiving, by the network device, the N positioning assistance subdata messages sent by the positioning server, where each of the N positioning assistance subdata messages carries one of the N pieces of positioning assistance subdata.

It should be understood that in this embodiment of this application, data volumes of the N pieces of positioning assistance subdata may be approximately equal or may not be equal. The positioning server may determine an amount of each piece of positioning assistance subdata depending on an actual situation. This is not limited in this embodiment of this application.

Therefore, in this embodiment of this application, when the positioning assistance data is relatively large, the positioning assistance data may be sent by using a plurality of positioning assistance data messages, to avoid generation of an excessively large message. In addition, when transmission of a positioning assistance data message fails, only the positioning assistance data message of which transmission fails needs to be retransmitted, thereby reducing a quantity of data retransmissions and improving system performance.

320. The network device broadcasts a system message to a terminal device.

Specifically, the system message is used by the terminal device to obtain the positioning assistance data. The system message may be a MIB, a SIB, a positioning-dedicated SIB, or the like. This embodiment of this application is not limited thereto.

Therefore, in this embodiment of this application, the network device broadcasts the system message to broadcast the positioning assistance data. In this way, a problem of low efficiency of transmitting positioning assistance data in the prior art can be resolved, and a problem in the prior art that a positioning server needs to perform signaling communication with each terminal device in a unicast transmission scenario can be avoided, thereby reducing signaling overheads.

In addition, the positioning server in this embodiment of this application can send the positioning assistance data to the network device with no need to request the network device, thereby reducing signaling overheads.

Figure 5:
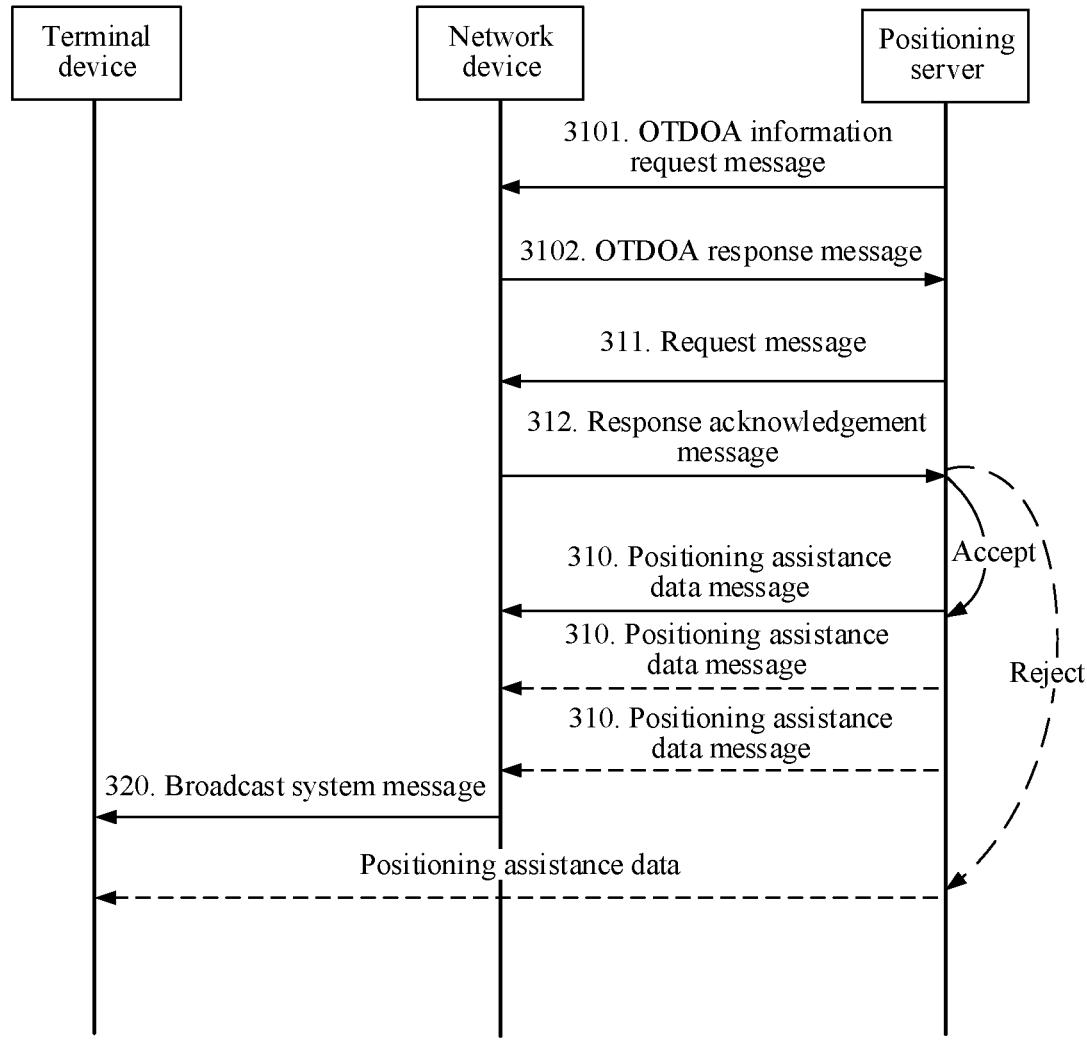
FIG. 5 is a flowchart of a method for transmitting positioning assistance data according to another embodiment of this application.

Optionally, in another embodiment, as shown in FIG. 5, before step 310, the method in this embodiment of this application may further include the following steps.

311. The positioning server sends a request message to the network device, where the request message is used to request the network device to forward the positioning assistance data.

312. The network device sends a response acknowledgement message to the positioning server, where the response acknowledgement message is used to indicate whether the network device accepts forwarding of the positioning assistance data.

Step 310 is performed only when the response acknowledgement message is used to indicate that the network device accepts forwarding of the positioning assistance data.

Therefore, in this embodiment of this application, the positioning server can send the positioning assistance data to the network device only when the request is accepted. Compared with a case in which there is no request, a response of the network device can be received when the request is not accepted, thereby avoiding unnecessary transmission and avoiding a waste of resources.

Alternatively, when the response acknowledgement message is used to indicate that the network device rejects forwarding of the positioning assistance data, the positioning server may send the positioning assistance data to the terminal device in unicast mode according to the solution in the prior art.

Therefore, in this embodiment of this application, even though the forwarding request of the positioning server is not accepted, the positioning assistance data may be sent to the terminal device in existing unicast mode, to improve compatibility of the method in this embodiment of this application.

It should be noted that in FIG. 5, the positioning server sends a separate message that carries the request message used to request the network device to forward the positioning assistance data.

Figure 6:
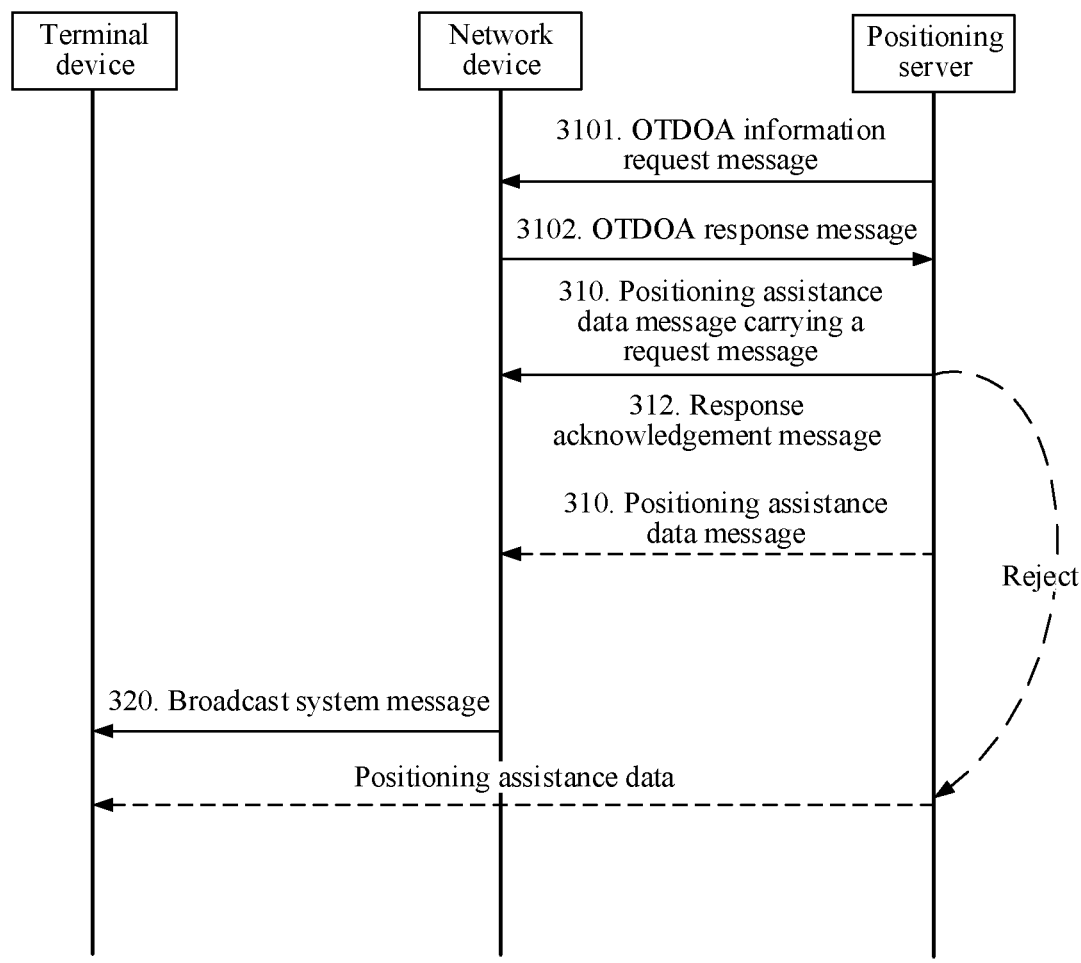
FIG. 6 is a flowchart of a method for transmitting positioning assistance data according to another embodiment of this application.

Alternatively, in another embodiment, as shown in FIG. 6, based on FIG. 4, the request message is carried in one of the at least one positioning assistance data message. Likewise, the request message is used to request the network device to forward the positioning assistance data.

Optionally, as shown in FIG. 6, the method may further include the following steps.

323. The network device sends a response acknowledgement message to the positioning server, where the response acknowledgement message is used to indicate whether the network device accepts forwarding of the positioning assistance data.

Step 310 is performed only when the response acknowledgement message is used to indicate that the network device accepts forwarding of the positioning assistance data.

Alternatively, when the response acknowledgement message is used to indicate that the network device rejects forwarding of the positioning assistance data, the positioning server may send the positioning assistance data to the terminal device in unicast mode according to the solution in the prior art.

It should be noted that when there are two or more pieces of positioning assistance data, the present disclosure can be implemented provided that step 323 is performed after the positioning assistance data message carrying the positioning assistance request message is sent and before step 320 is performed. Step 323 may be relatively flexibly performed in this embodiment of this application. For example, step 323 may be performed between sending of two positioning assistance data messages, or may be performed after all positioning assistance data messages are sent.

It should be noted that, that the positioning server obtains the positioning assistance data according to the existing solution is described above. That is, the positioning server obtains the positioning assistance data by requesting the network device.

Alternatively, in this embodiment of this application, the positioning assistance data may be obtained in another manner. For example, when the positioning assistance data includes differential satellite positioning assistance data, step 3101 and step 3102 in FIG. 4 to FIG. 6 may be replaced with the following steps.

3103. The positioning server sends a positioning information request message to the network device.

For example, the positioning information request message may be an A-GNSS information request message. The positioning information request message is used to request to obtain device information of the network device. The device information may include at least one of the following information: location information of the network device and identification information of the network device.

3104. The network device sends a positioning information response message to the positioning server.

Specifically, the positioning information response message carries the device information. In this way, the positioning server determines the positioning assistance data based on the obtained device information.

Figure 7:
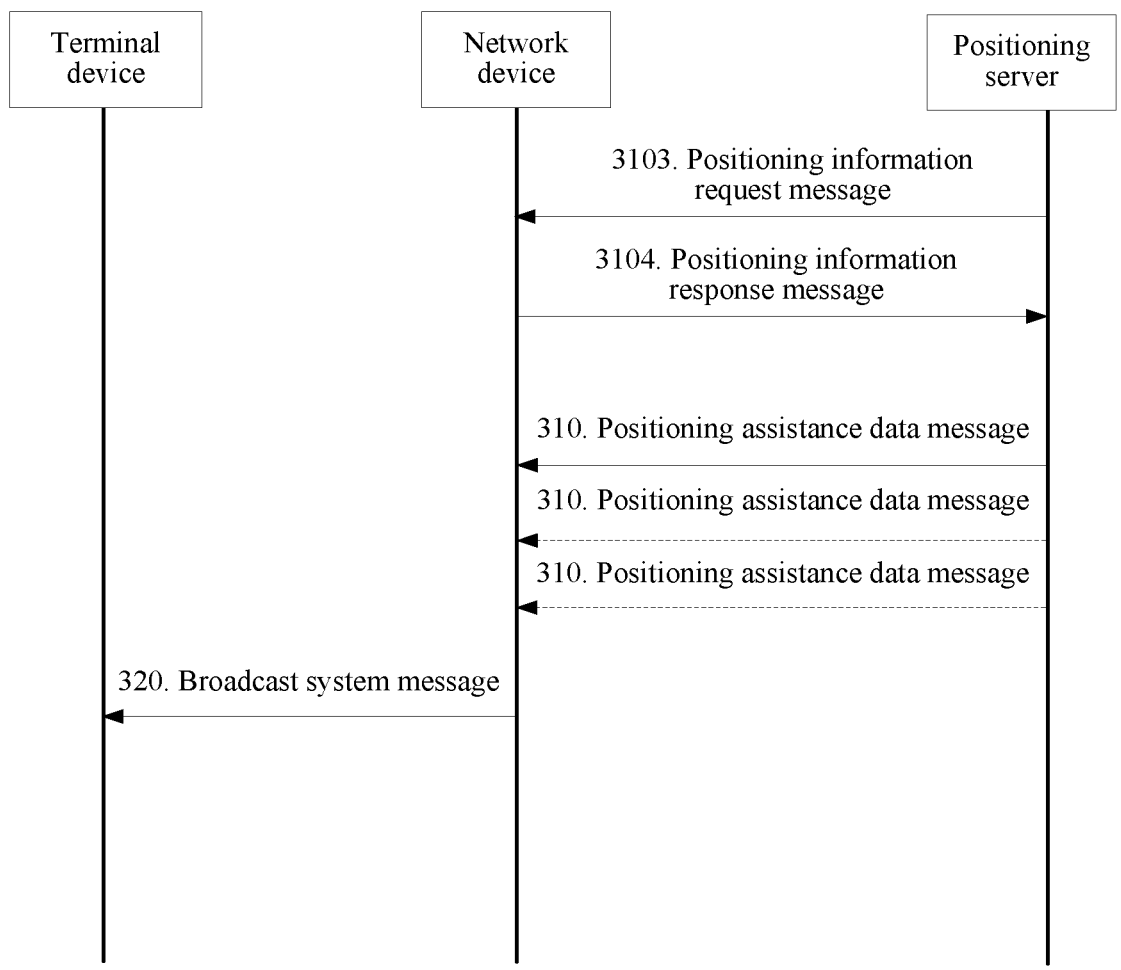
FIG. 7 is a flowchart of a method for transmitting positioning assistance data according to another embodiment of this application.

For example, when the positioning assistance data is differential satellite positioning assistance data, step 3101 and step 3102 in FIG. 4 may be replaced with step 3103 and step 3104 to form an embodiment of FIG. 7. Specific processing processes of other steps are the same, and a difference lies only in that content of the positioning assistance data is different. Optionally, when the positioning assistance data is differential satellite positioning assistance data, the embodiments of FIG. 5 and FIG. 6 may form corresponding embodiments by replacing step 3101 and step 3102 with step 3103 and step 3104. For brevity, no further figures are provided for expression herein.

It should be understood that in this embodiment of this application, an A-GNSS (Assisted Global Navigation Satellite System) information response message includes location information of a base station and an identity of the base station (whether the base station is a satellite reference station). Subsequent messages and procedures are the same as those in the foregoing embodiment. A GNSS (Global Navigation Satellite System) includes a GPS (Global Positioning System), a modern GPS, a Galileo (Galileo), a GLONASS (Global Navigation Satellite System), an SBAS (Space Based Augmentation System), a QZSS (Quasi Zenith Satellite System), a BDS (BeiDou Navigation Satellite System), and the like. Different GNSSs (for example, the GPS and the Galileo) may independently or jointly applied to assisted positioning.

It should be understood that the positioning request message in step 3103 in this embodiment of this application may carry a list of data that needs to be requested, and the network device may feed back corresponding data based on the list. Alternatively, the positioning request message in step 3104 may not carry a list of data that needs to be requested. After obtaining the request message, the network device may feed back corresponding data according to a predefined list (rule). This is not limited in this embodiment of this application.

All of the foregoing various embodiments described in FIG. 4 and FIG. 7 can be applied to the system scenarios shown in FIG. 1 and FIG. 2. A difference lies in that manners of obtaining the positioning assistance data are different. When the embodiments are applied to the scenario in FIG. 1, the positioning server may obtain the positioning assistance data in the manner in step 3101 and step 3102. When the embodiments are applied to the scenario in FIG. 2, the positioning server may obtain the positioning assistance data from an RTK positioning server. Specifically, during positioning, the RTK positioning server may obtain the positioning assistance data, for example, obtain the positioning assistance data from a reference station. Then, the RTK positioning server sends the positioning assistance data to the positioning server.

Figure 8:
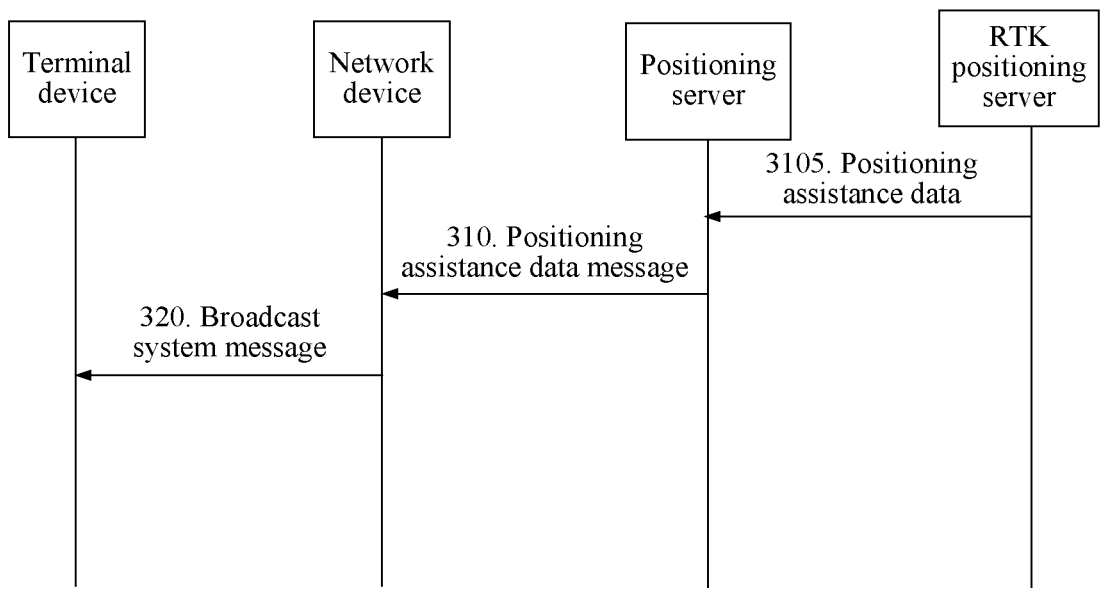
FIG. 8 is a flowchart of a method for transmitting positioning assistance data according to another embodiment of this application.

Specifically, as shown in FIG. 8, before step 310, the method may further include the following step.

3105. The RTK positioning server sends the positioning assistance data to the positioning server.

For example, after obtaining the positioning assistance data from the reference station, the RTK positioning server sends the positioning assistance data to the positioning server. The reference station may be a base station, for example, a Qianxun reference station or another reference station. This is not limited in this embodiment of this application.

The positioning assistance data may be RTK data, ephemeris data, RTD data or correction data (correction data), and other data transmitted by using a differential signal format (RTCM). This embodiment of this application is not limited thereto.

It should be understood that the positioning server may further receive at least one of the following information sent by the RTK positioning server:

an identifier of the network device (for example, a target eNodeB identifier (Target eNB ID)), a cell identifier (Cell ID) of the terminal device, an area identifier (Area ID) of the terminal device, a transmission procedure identifier (transaction ID)/a service identifier, a quality of service QoS requirement of the RTK data, and a data transmission rate of the positioning assistance data obtained by the RTK server. Specifically, the RTK server may send the information to the positioning server by using an interface message.

In this embodiment of this application, the positioning assistance data may be transmitted by using a differential signal format (Radio Technical Commission for Maritime services, RTCM). For example, after obtaining the positioning assistance data, the reference station transmits the positioning assistance data to the RTK server by using the RTCM transmission format.

It should be understood that in the embodiments of this application, in step 310, only a situation in which the positioning server sends the positioning assistance data to the network device by using the at least one positioning assistance data message is shown. However, the embodiments of this application are not limited thereto. Alternatively, in the embodiments of this application, the positioning server may send the positioning assistance data to the network device by using an MME, where the MME sends the data to the network device; or may send the positioning assistance data to the network device by using an LPPa message.

It should be noted that in the embodiments of this application, for step 320 in the embodiments of FIG. 4 to FIG. 8, the network device may explicitly or implicitly transmit the positioning assistance data by using the system message. Specifically, in an explicit transmission case, the system message may carry the positioning assistance data. In an implicit case, the system message may carry first indication information or parameter information to indicate a resource bearing the positioning assistance data. An interaction process between the network device and the terminal device is described in detail below for these cases separately with reference to FIG. 9 to FIG. 12.

Figure 9:
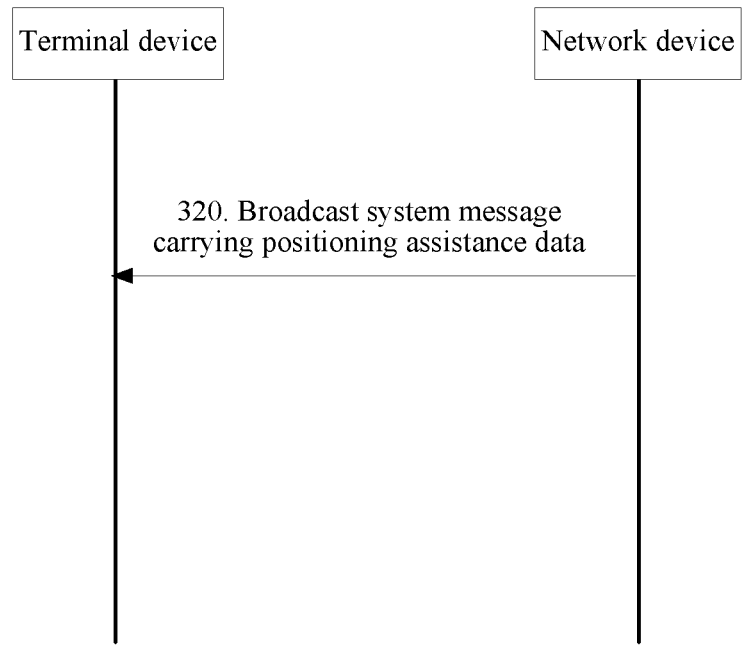
FIG. 9 is a flowchart of a method for transmitting positioning assistance data according to another embodiment of this application.

Specifically, as shown in FIG. 9, the system message in step 320 carries the positioning assistance data.

The system message may be a MIB, a SIB, or a positioning-dedicated SIB in an existing system. The MIB and the SIB may be system message resources in one of the foregoing plurality of network systems to which this embodiment of this application can be applied.

Therefore, in this embodiment of this application, the network device broadcasts the message to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

In the foregoing embodiment, the positioning server may send the positioning assistance data to the network device (the base station) by using an LPPa protocol between the positioning server and the network device. Alternatively, the positioning server may first send the positioning assistance data to a core network device, for example, an MME, and then the core network device sends the positioning assistance data to the network device.

In another embodiment, when the positioning server and the RTK server are integrated as one server, the positioning server may directly obtain the positioning assistance data from the reference station, and send the positioning assistance data to the network device. A sending manner is the same as that in the foregoing descriptions, and details are not described herein again.

Figure 10:
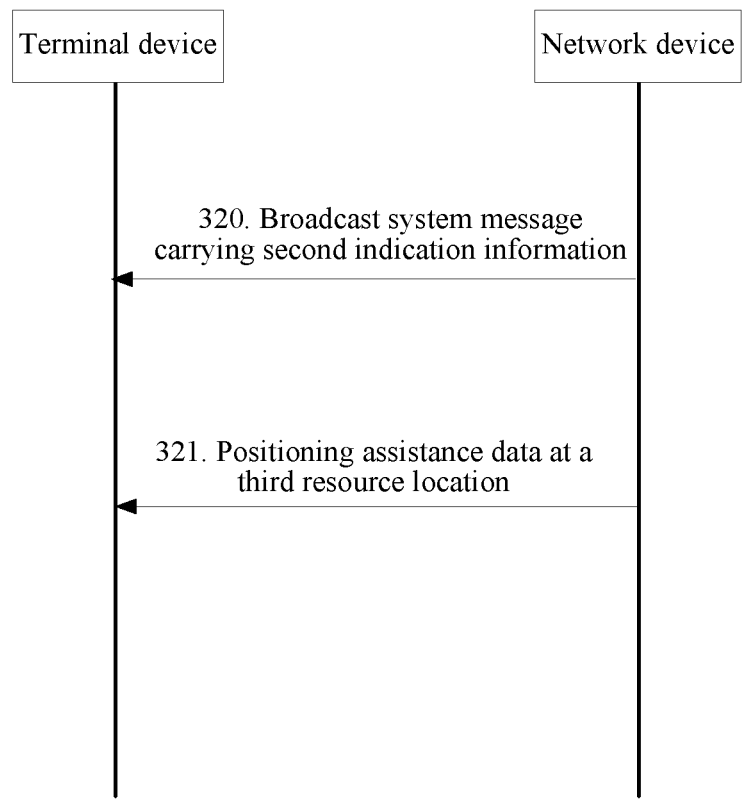
FIG. 10 is a flowchart of a method for transmitting positioning assistance data according to another embodiment of this application.

Alternatively, as shown in FIG. 10, the system message in step 320 carries second indication information.

For example, the second indication information may be used to instruct the network device to transmit a third resource location for sending the positioning assistance data.

For example, the second indication information may be scheduling information. The scheduling information may include the third resource location, that is, a frequency-domain resource location of a third resource, a scheduling delay, a period, a starting subframe location, an offset, an MCS, a quantity of repetitions, and the like. This embodiment of this application is not limited thereto.

When the system message carries the second indication information, after step 320 in the embodiments of FIG. 4 to FIG. 7, the method may further include the following step.

321. The terminal device receives the positioning assistance data sent by the network device at the third resource location.

The third resource location, for example, may be a location of a PDSCH resource. The PDSCH may be a PDSCH resource in one of the foregoing plurality of network systems to which this embodiment of this application can be applied.

Therefore, in this embodiment of this application, the network device sends the positioning assistance data to the terminal device by using two steps. The second indication information having a relatively small data volume may be added to the system message to reduce a size of the system message. In addition, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

Figure 11:
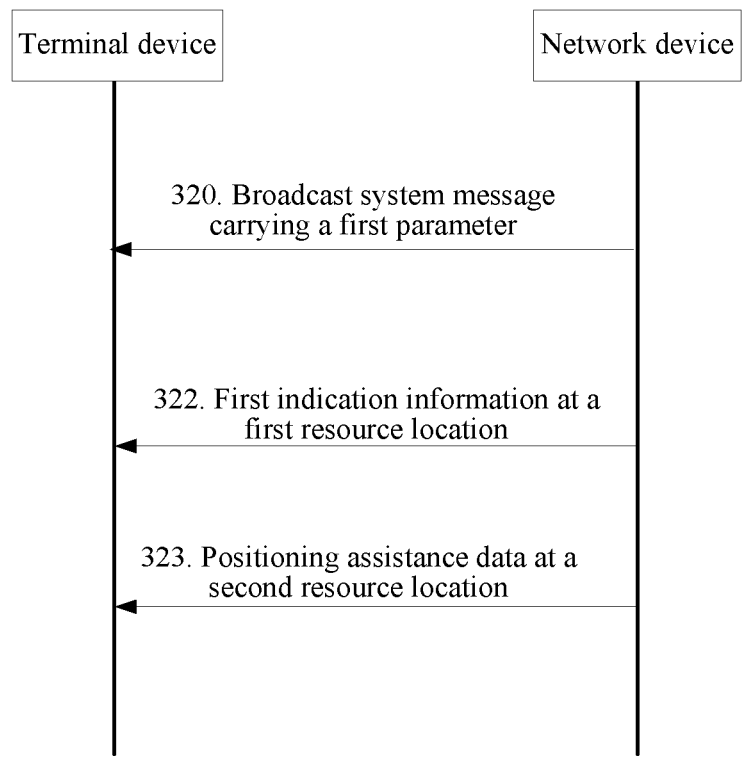
FIG. 11 is a flowchart of a method for transmitting positioning assistance data according to another embodiment of this application.

Alternatively, as shown in FIG. 11, the system message in step 320 carries at least one first parameter.

For example, the first parameter is used by the terminal device to detect first indication information at a first resource location, and the first indication information is used to indicate a second resource location at which the network device is to send the positioning assistance data.

Specifically, the first parameter may be a positioning RNTI, the first resource location may be a location of a PDCCH resource, the first indication information may be DCI borne on the PDCCH, and the second resource location may be a location of a PDSCH resource. The PDCCH may be a PDCCH resource in one of the foregoing plurality of network systems to which this embodiment of this application can be applied. The PDSCH may be a PDSCH resource in one of the foregoing plurality of network systems to which this embodiment of this application can be applied. Specifically, the RNTI may be an RNTI allocated by the network device for RTK, for example, an RTK-RNTI, or may be a predefined RNTI for RTK positioning. Alternatively, the RNTI may be allocated or predefined according to different positioning methods.

Correspondingly, when the system message carries the first parameter, after step 320 in the embodiments of FIG. 4 to FIG. 7, the method may further include the following steps.

322. The network device sends the first indication information at the first resource location.

Correspondingly, the terminal device receives the first indication information sent by the network device at the first resource location.

323. The network device sends the positioning assistance data at the second resource location.

Correspondingly, the terminal device receives the positioning assistance data sent by the network device at the second resource location.

Therefore, in this embodiment of this application, the network device sends the positioning assistance data to the terminal device by using three steps. First parameter information having a relatively small data volume may be added to the system message to reduce a size of the system message. In addition, the first indication information may be detected on a predefined resource by using the first parameter, to reduce signaling overheads on a second resource. In addition, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

It should be noted that the at least one first parameter in this embodiment of this application may include one parameter or may include a plurality of parameters. For example, the first parameter may include a plurality of (groups of) positioning RNTIs, and each (group of) positioning RNTI corresponds to one positioning method or one mode of one positioning method. For example, a positioning RNTI 1 corresponds to an OTDOA method, and a positioning RNTI 2 corresponds to an A-GNSS method.

When the first parameter in this embodiment of this application includes one (group of) positioning RNTI, the terminal completes subsequent receiving by using the (group of) obtained positioning RNTI. The (group of) positioning RNTI corresponds to one positioning method, for example, an OTDOA cellular positioning method or GPS satellite positioning.

When the first parameter in this embodiment of this application includes two (groups of) positioning RNTIs, the terminal completes subsequent receiving by using the obtained two (groups of) different positioning RNTIs. The two (groups of) different positioning RNTIs correspond to two different positioning methods, for example, OTDOA and GPS satellite positioning.

When the first parameter in this embodiment of this application includes two (groups of) positioning RNTIs, the terminal completes subsequent receiving by using the obtained two (groups of) different positioning RNTIs. The two (groups of) different positioning RNTIs correspond to two different modes of one positioning method, for example, GPS satellite positioning and BeiDou satellite positioning.

When the first parameter in this embodiment of this application includes three (groups of) positioning RNTIs, the terminal completes subsequent receiving by using the obtained three (groups of) different positioning RNTIs. The three (groups of) different positioning RNTIs correspond to two positioning methods and two different modes of one of the two positioning methods, for example, OTDOA cellular positioning, GPS satellite positioning, and BeiDou satellite positioning.

Specifically, each positioning RNTI corresponds to one PDCCH resource, and DCI borne on the PDCCH resource indicates a PDSCH resource bearing a corresponding positioning assistance data. Specifically, the PDSCH bears MTCH information. That is, a simplified multicast mode is used. No scheduling is performed on an MCCH, and a PDCCH listened to by UE schedules time frequency resources on an MTCH. The positioning assistance data (which may include OTDOA positioning assistance data, for example, a measurement configuration, RTK data, correction data, or the like) is transmitted by using the MTCH. Herein, the grouping may be performed according to different positioning methods, different modes corresponding to a positioning method, or a combination thereof. This embodiment of this application is not limited thereto.

Figure 12:
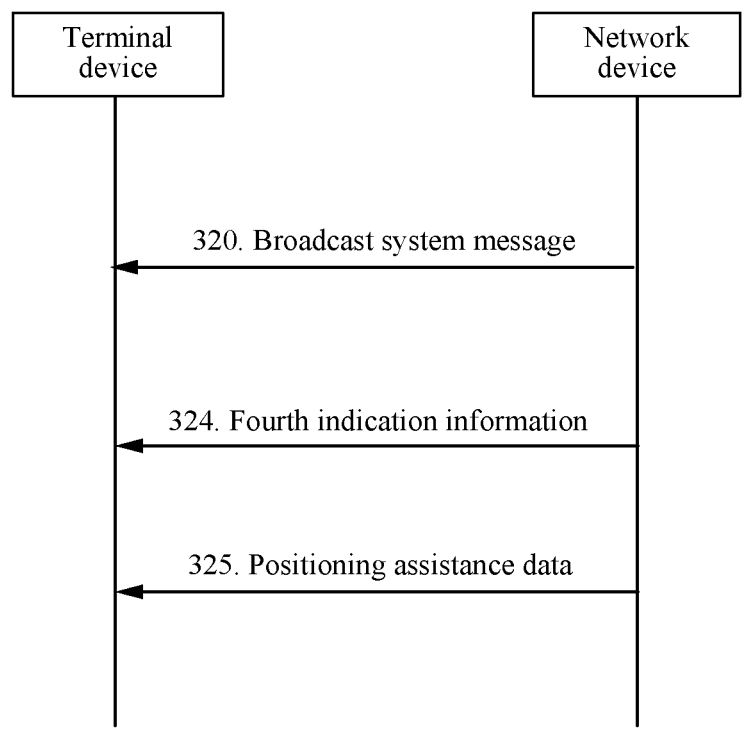
FIG. 12 is a flowchart of a method for transmitting positioning assistance data according to another embodiment of this application.

Alternatively, as shown in FIG. 12, the system message in step 320 carries third indication information.

For example, the third indication information is used to instruct the terminal device to detect fourth indication information on a fourth resource, and the fourth indication information is used to indicate a fifth resource location of the positioning assistance data.

For example, the third indication information may be scheduling information. The scheduling information may include a fourth resource location. That is, a fourth resource may include at least one of the following information: a frequency-domain resource location, a scheduling delay, a period, a starting subframe location, an offset, an MCS, a quantity of repetitions, and the like. The fourth indication information may be scheduling information. The scheduling information may include the fifth resource location. That is, a fifth resource may include at least one of the following information: a frequency-domain resource location, a scheduling delay, a period, a starting subframe location, an offset, an MCS, a quantity of repetitions, and the like. This embodiment of this application is not limited thereto.

Specifically, the third indication information is used to indicate a location of a first PDCCH resource. DCI on the first PDCCH resource instructs the terminal device to detect the fourth indication information on the fourth resource. For example, the fourth resource is a first PDSCH resource, and the fourth indication information is MCCH information.

The fourth indication information may indicate a location of a second PDCCH resource. DCI on the second PDCCH resource indicates a location of the fifth resource bearing the positioning assistance data. For example, the fifth resource is a second PDSCH resource, and the positioning assistance data may be borne on an MTCH traffic channel borne on the second PDSCH resource.

Correspondingly, when the system message carries the third indication information, after step 320 in the embodiments of FIG. 4 to FIG. 8, the method may further include the following steps.

324. The network device sends the fourth indication information on the fourth resource.

325. Send the positioning assistance data at the fifth resource location.

Specifically, the terminal device obtains the third indication information based on the system message.

The terminal device detects the fourth indication information on the fourth resource based on the third indication information.

The terminal device obtains the positioning assistance data on the fifth resource based on the fourth indication information.

For example, the terminal device may descramble a PDCCH by using the first parameter (for example, the RTK-RNTI) added by the network device to the system message, to obtain the fourth resource location, and obtain the fourth indication information (for example, the MCCH information) at the fourth resource location, and further, to detect the fifth resource based on the fourth indication information to obtain the positioning assistance data.

Therefore, in this embodiment of this application, the network device sends the positioning assistance data to the terminal device by using a plurality of steps. The third indication information having a relatively small data volume may be added to the system message to resolve a problem that the positioning assistance data cannot be transmitted at a time due to a limited size of the system message. In addition, an existing problem of low efficiency of transmitting positioning assistance data can be resolved, and a problem in the prior art that a positioning server needs to perform signaling communication with each terminal device in a unicast transmission scenario can be avoided, thereby reducing signaling overheads.

The method for transmitting positioning assistance data in the embodiments of this application are described in detail above with reference to FIG. 1 to FIG. 12. It should be noted that the examples in FIG. 1 to FIG. 12 are merely intended to help a person skilled in the art understand the embodiments of this application, rather than limit the embodiments of this application to exemplified specific values or specific scenarios. Apparently, a person skilled in the art may make various equivalent modifications or changes based on the examples in FIG. 1 to FIG. 12. Such modifications or changes shall also fall within the range of the embodiments of this application.

It should be understood that sequence numbers of the foregoing processes do not indicate an execution sequence, and an execution sequence of processes shall be determined based on functions and internal logic thereof, and shall constitute no limitation on an implementation process of the embodiments of this application.

In the following descriptions, the network device in the embodiments of this application is described with reference to FIG. 13, the positioning server in the embodiments of this application is described with reference to FIG. 14, and the terminal device is described with reference to FIG. 15.

Figure 13:
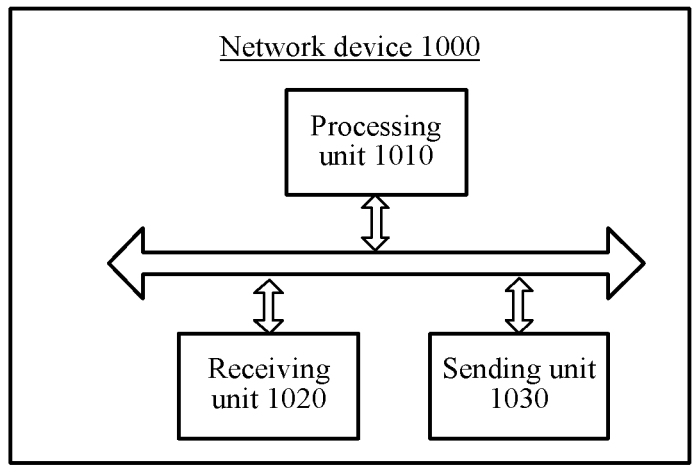
FIG. 13 is a schematic block diagram of a network device according to an embodiment of this application.

FIG. 13 is a schematic block diagram of a network device 1000 according to an embodiment of this application. Specifically, as shown in FIG. 13, the network device 1000 includes a processing unit 1010, a receiving unit 1020, and a sending unit 1030. The processing unit 1010 is connected to the receiving unit 1020 and the sending unit 1030. It should be understood that the processing unit 1010 may be a processor. The processor may be a central processing unit (CPU). The processor may alternatively be another general-purpose processor, a digital signal processor (DSP), an application-specific integrated circuit (ASIC), a field programmable gate array (FPGA) or another programmable logic device, discrete gate or transistor logic device, or discrete hardware component, or the like. The general-purpose processor may be a microprocessor or the processor may be any conventional processor, or the like.

Optionally, the network device 1000 further includes a memory. The memory is connected to the processor 1010. The memory may be configured to store an instruction. The processor 1010 is configured to execute the instruction stored in the memory, to control the sending unit 1030 to send a signal or information, and to control the receiving unit 1020 to receive a signal or information.

Specifically, the receiving unit 1020 is configured to receive a positioning assistance data message sent by a positioning server, where the positioning assistance data message is used to carry positioning assistance data.

The sending unit 1030 is configured to broadcast a system message to a terminal device, where the system message is used by the terminal device to obtain the positioning assistance data.

Therefore, in this embodiment of this application, the network device broadcasts the system message to broadcast the positioning assistance data. In this way, a problem of low efficiency of transmitting positioning assistance data in the prior art can be resolved, and a problem in the prior art that a positioning server needs to perform signaling communication with each terminal device in a unicast transmission scenario can be avoided, thereby reducing signaling overheads.

Optionally, in another embodiment, the sending unit is specifically configured to broadcast, to the terminal device, the system message carrying the positioning assistance data.

Optionally, in another embodiment, the sending unit is specifically configured to broadcast, to the terminal device, a system message carrying second indication information, where the second indication information is used to instruct the network device to transmit a third resource location for sending the positioning assistance data.

Optionally, in another embodiment, the sending unit is further configured to send the positioning assistance data at the third resource location.

Optionally, in another embodiment, the receiving unit 1020 is specifically configured to receive at least one positioning assistance data message sent by a positioning server, where the positioning assistance data message is used to carry positioning assistance data.

The sending unit 1030 is configured to broadcast, to the terminal device, a system message carrying at least one first parameter, where each first parameter is used by the terminal device to detect first indication information at a first resource location, and the first indication information is used to indicate a second resource location at which the network device is to send the positioning assistance data received by the receiving unit 1020.

Therefore, in this embodiment of this application, the network device broadcasts the message to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

Optionally, in another embodiment, the sending unit is further configured to send the first indication information at the first resource location, and send, at the second resource location, the positioning assistance data received by the receiving unit.

Optionally, in another embodiment, when the positioning assistance data includes at least two pieces of positioning assistance subdata, that the at least one positioning assistance data message received by the receiving unit is used to carry positioning assistance data includes:

each positioning assistance data message carries one piece of positioning assistance subdata.

Optionally, in another embodiment, the receiving unit is further configured to receive a positioning information request message sent by the positioning server, where the positioning request message is used to request to obtain device information of the network device, and the device information includes at least one of the following information: location information of the network device and identification information of the network device.

The sending unit is further configured to send a positioning information response message to the positioning server, where the positioning response message carries the device information.

Optionally, in another embodiment, the positioning assistance data is ephemeris data, real-time kinematic RTK data, or correction data.

Optionally, in another embodiment, the positioning assistance data message is a Long Term Evolution Positioning Protocol A LPPa message or an RTCM message.

It should be understood that the network device 1000 shown in FIG. 13 can implement each process related to the network device in the method embodiments of FIG. 4 to FIG. 12. Operations and/or functions of various modules in the network device 1000 are intended to implement corresponding procedures in the method embodiments of FIG. 4 to FIG. 12. For details, refer to the descriptions in the method embodiments. To avoid repetition, details are properly omitted herein.

Therefore, in this embodiment of this application, the network device broadcasts the message to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

Figure 14:
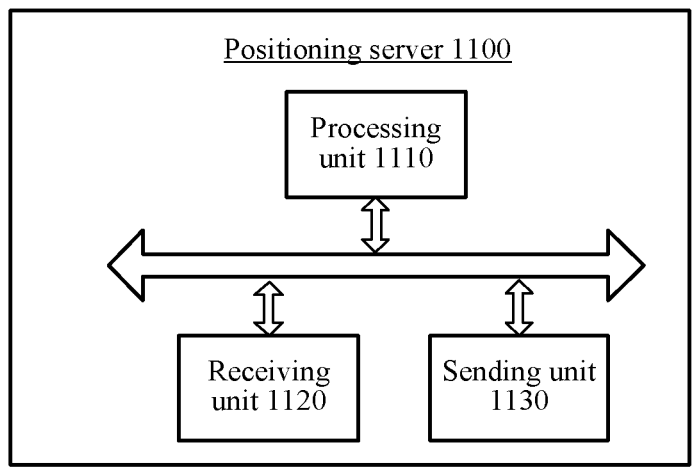
FIG. 14 is a schematic block diagram of a positioning server according to an embodiment of this application.

FIG. 14 is a schematic block diagram of a positioning server 1100 according to an embodiment of this application. Specifically, as shown in FIG. 14, the positioning server 1100 includes a processing unit 1110, a receiving unit 1120, and a sending unit 1130. The processing unit 1110 is connected to both the receiving unit 1120 and the sending unit 1130. It should be understood that the processing unit 1110 may be a processor. The processor may be a central processing unit (CPU). The processor may alternatively be another general-purpose processor, a digital signal processor (DSP), an application-specific integrated circuit (ASIC), a field programmable gate array (FPGA) or another programmable logic device, discrete gate or transistor logic device, or discrete hardware component, or the like. The general-purpose processor may be a microprocessor or the processor may be any conventional processor, or the like.

Optionally, the positioning server 1100 further includes a memory. The memory is connected to the processor 1110. The memory may be configured to store an instruction. The processor 1110 is configured to execute the instruction stored in the memory, to control the sending unit 1130 to send a signal or information, and to control the receiving unit 1120 to receive a signal or information.

Specifically, the receiving unit 1120 is configured to obtain positioning assistance data.

The sending unit 1130 is configured to send at least one positioning assistance data message to a network device, where the at least one positioning assistance data message carries the positioning assistance data obtained by the receiving unit 1120, the positioning assistance data message is used to trigger the network device to broadcast a system message to a terminal device, and the system message is used by the terminal device to obtain the positioning assistance data.

Therefore, in this embodiment of this application, the positioning server sends the positioning assistance data to the network device, and triggers the network device to broadcast the system message to the terminal device, to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

Optionally, in another embodiment, when the positioning assistance data includes at least two pieces of positioning assistance subdata, that the at least one positioning assistance data message sent by the sending unit 1130 is used to carry positioning assistance data includes:

each positioning assistance data message carries one piece of positioning assistance subdata.

Optionally, in another embodiment, the positioning assistance data includes differential satellite positioning assistance data.

The receiving unit 1120 is further configured to receive a positioning information request message sent by the positioning server, where the positioning request message is used to request to obtain device information of the network device, and the device information includes at least one of the following information: location information of the network device and identification information of the network device.

The sending unit 1130 is further configured to send a positioning information response message to the positioning server, where the positioning response message carries the device information.

The receiving unit is specifically configured to obtain the positioning assistance data based on the device information.

Optionally, in another embodiment, the positioning assistance data is ephemeris data, real-time kinematic RTK data, or correction data.

Optionally, in another embodiment, the receiving unit is specifically configured to receive the positioning assistance data sent by an RTK positioning server.

Optionally, in another embodiment, the positioning assistance data message is a Long Term Evolution Positioning Protocol A LPPa message or an RTCM message.

Optionally, in another embodiment, the receiving unit is further configured to receive at least one of the following information sent by the RTK positioning server:

an identifier of the network device, a cell identifier of the terminal device, an area identifier of the terminal device, a transmission procedure identifier/a service identifier, a quality of service QoS requirement of the RTK data, and a data transmission rate of the positioning assistance data obtained by the RTK server.

It should be understood that the positioning server 1100 shown in FIG. 14 can implement each process related to the positioning server in the method embodiments of FIG. 4 to FIG. 12. Operations and/or functions of various modules in the positioning server 1100 are intended to implement corresponding procedures in the method embodiments of FIG. 4 to FIG. 12. For details, refer to the descriptions in the method embodiments. To avoid repetition, details are properly omitted herein.

Therefore, in this embodiment of this application, the positioning server sends the positioning assistance data to the network device, and triggers the network device to broadcast the system message to the terminal device, to broadcast the positioning assistance data. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

Figure 15:
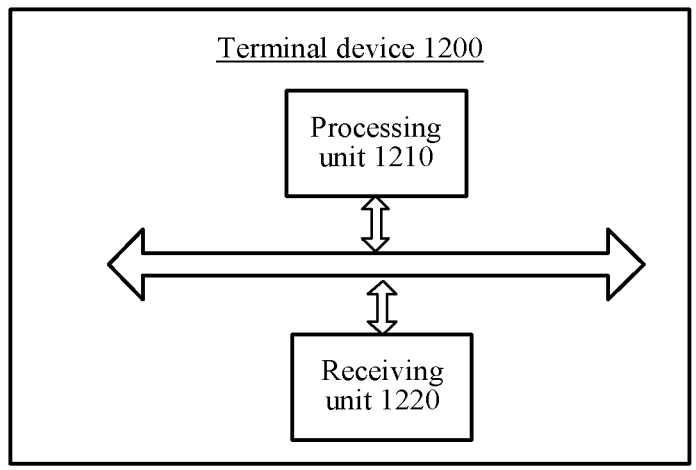
FIG. 15 is a schematic block diagram of a terminal device according to an embodiment of this application.

FIG. 15 is a schematic block diagram of a terminal device 1200 according to an embodiment of this application. Specifically, as shown in FIG. 15, the positioning server 1200 includes a processing unit 1210 and a receiving unit 1220. The processing unit 1210 is connected to the receiving unit 1220. It should be understood that the processing unit 1210 may be a processor. The processor may be a central processing unit (CPU). The processor may alternatively be another general-purpose processor, a digital signal processor (DSP), an application-specific integrated circuit (ASIC), a field programmable gate array (FPGA) or another programmable logic device, discrete gate or transistor logic device, or discrete hardware component, or the like. The general-purpose processor may be a microprocessor or the processor may be any conventional processor, or the like.

Optionally, the terminal device 1200 further includes a memory. The memory is connected to the processor 1210. The memory may be configured to store an instruction. The processor 1210 is configured to execute the instruction stored in the memory, to control the receiving unit 1220 to receive a signal or information.

Specifically, the receiving unit 1220 is configured to receive a system message broadcast by a network device.

The processing unit 1210 is configured to obtain positioning assistance data based on the system message.

Therefore, in this embodiment of this application, the terminal device receives the system message broadcast by the network device, and obtains the positioning assistance data based on the system message. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

Optionally, in another embodiment, the receiving unit is specifically configured to receive the system message that is broadcast by the network device and that carries the positioning assistance data.

Optionally, in another embodiment, the receiving unit is specifically configured to receive a system message that is broadcast by the network device and that carries second indication information, where the second indication information is used to instruct the network device to transmit a third resource location for sending the positioning assistance data.

The processing unit is specifically configured to: obtain the second indication information based on the system message; and obtain the positioning assistance data at the third resource location based on the second indication information.

Optionally, in another embodiment, the receiving unit 1220 is specifically configured to receive a system message that is broadcast by the network device and that carries at least one first parameter.

The processing unit 1210 is specifically configured to detect a first indication message at a first resource location based on the first parameter received by the receiving unit, where the first indication information is used to indicate a second resource location at which the network device is to send the positioning assistance data.

The processing unit 1210 is further configured to obtain the positioning assistance data based on the second resource location indicated by the first indication information.

Therefore, in this embodiment of this application, the terminal device receives the system message broadcast by the network device, and obtains the positioning assistance data based on the system message. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

Optionally, in another embodiment, the positioning assistance data includes differential satellite positioning assistance data.

Alternatively, in another embodiment, the positioning assistance data is ephemeris data, real-time kinematic RTK data, or correction data.

It should be understood that the terminal device 1200 shown in FIG. 15 can implement each process related to the terminal device in the method embodiments of FIG. 4 to FIG. 12. Operations and/or functions of various modules in the terminal device 1200 are intended to implement corresponding procedures in the method embodiments of FIG. 4 to FIG. 12. For details, refer to the descriptions in the method embodiments. To avoid repetition, details are properly omitted herein.

Therefore, in this embodiment of this application, the terminal device receives the system message broadcast by the network device, and obtains the positioning assistance data based on the system message. In this way, a problem of low efficiency of transmitting existing centralized positioning assistance data can be resolved, and a problem in the prior art that a positioning server needs to perform signaling communication with each terminal device in a unicast transmission scenario can be avoided, thereby reducing signaling overheads.

Because positioning assistance data is sent in a broadcast message or is indicated and sent through indication by using a broadcast first parameter. In this case, UE may be in idle mode. If a cell in which the UE resides in idle mode is not a cell having relatively high strength or relatively good quality, performance of the UE in receiving a system message is relatively poor, causing a failure in obtaining the positioning assistance data, and leading to a reduction in an overhead gain brought by broadcasting positioning assistance information.

To resolve this problem, a neighboring cell measurement mechanism of the UE in idle mode needs to be considered. In this way, the UE in idle mode can find a better neighboring cell in a timely manner, to reside in a cell having better quality. The method is applicable to the UE in idle mode that receives the positioning assistance data, and is also applicable to ordinary UE in idle mode. Herein, the embodiments are described by using the ordinary UE as an example. Behavior of the UE receiving the positioning assistance data is the same as that of the ordinary UE.

To expand a coverage range of a cell, a base station may repeatedly perform uplink and downlink sending, so that the UE can support data receiving at a normal coverage level, and can implement data receiving at a coverage enhancement level. The receiving at the coverage enhancement level means that a terminal can receive a channel repeatedly sent by a base station, such as a synchronization channel, a broadcast channel, a control channel, a data channel, and a reference symbol.

The solution of triggering neighboring cell measurement in a timely manner includes the following several manners:

Manner 1: A signal strength trigger mechanism and a signal quality trigger mechanism are combined. Signal strength is an indicator similar to an RSRP/NRSRP/MRSRP/RSSI or the like. Signal quality is an indicator similar to an RSRQ/NRSRQ/SNR, $\hat{E}s/Iot$, SNR, $E_c/I_o$, or the like when an interference factor is considered. In an existing trigger mechanism combining signal strength and signal quality, measurement can be started only when a signal strength trigger threshold of a serving cell and a signal quality retransmission threshold of the serving cell are both satisfied. An advantage is reducing an opportunity of neighboring cell measurement, thereby reducing measurement consumption of the UE. In this application, it is expected to avoid a problem that UE at a high coverage level cannot trigger neighboring cell measurement to find a better neighboring cell due to an excessively-low specified signal strength threshold.

In this application, the trigger mechanism combining the signal strength and the signal quality is:

If a signal strength threshold for measurement trigger does not satisfy a threshold, UE detects whether a signal quality threshold satisfies a threshold. If the signal quality threshold satisfies the threshold, the UE starts neighboring cell measurement. The signal strength threshold and the signal quality threshold may be at least one of a signal strength threshold and a signal quality threshold of a serving cell, and a signal strength offset and a signal quality offset of the serving cell. The signal strength offset or the signal quality offset may be a difference between a current result and a previously stored result or may be an offset configured in a network.

Alternatively, if a signal quality threshold does not satisfy a threshold, UE detects whether a signal strength threshold satisfies a threshold. If the signal strength threshold satisfies the threshold, the UE starts neighboring cell measurement. The signal strength threshold and the signal quality threshold may be at least one of a signal strength threshold and a signal quality threshold of a serving cell, and a signal strength offset and a signal quality offset of the serving cell. The signal strength offset or the signal quality offset may be a difference between a current result and a previously stored result or may be an offset configured in a network.

Manner 2: Only a signal strength trigger mechanism is used, in which a plurality of thresholds are used, and different thresholds correspond to UE in different modes.

Signal strength may be at least one of a signal strength threshold of a serving cell and a signal strength offset of the serving cell. The signal strength offset may be a difference between a current result and a previously stored result or may be an offset configured in a network.

The UE in idle modes is classified into two types according to a coverage degree: UE at a high coverage level and UE hat a low coverage level. A signal strength trigger threshold is used for the UE at the high coverage level, and another signal strength trigger threshold is used for the UE at the low coverage level. A neighboring cell measurement trigger threshold of the UE at the low coverage level may be less than a neighboring cell measurement trigger threshold of the UE at the high coverage level. The network or the terminal uses different neighboring cell measurement trigger thresholds depending on different coverage statuses of UE.

The different thresholds may alternatively be set in other several manners.

Manner 1: Integer indication ranges of thresholds configured in the network are the same, but step sizes used for the thresholds are different. For example, a value of neighboring cell measurement based on signal strength is configured as an integer $(0, \ldots, M1)$. UE at the high coverage level may use a relatively small step size. For example, the step size is N1. In this case, a value range represented by a threshold is an integer $(0, \ldots, M1)*N1$ dB, where M1 and N1 are positive integers.

For example, a value of neighboring cell measurement based on signal strength is configured as an integer $(0, \ldots, M1)$. UE at the low coverage level may use a relatively large step size, to obtain a larger threshold configuration range. For example, the step size is N2. In this case, a value range represented by a threshold is an integer $(0, \ldots, M1)*N2$ dB, where M1 and N2 are positive integers, and N2>N1.

Manner 2: Integer indication ranges of thresholds configured in the network are different. For example, a value of neighboring cell measurement based on signal strength is configured as an integer $(0, \ldots, M1)$. UE at the high coverage level may use a step size of N1. In this case, a value range represented by a threshold is an integer $(0, \ldots, M1)*N1$ dB, where M1 and N1 are positive integers.

For example, a value of neighboring cell measurement based on signal strength is configured as an integer $(0, \ldots, M2)$, to obtain a larger threshold configuration range. UE at the low coverage level may use a step size of N1. In this case, a value range represented by a threshold is an integer $(0, \ldots, M2)*N1$ dB, where M2 and N1 are positive integers, and M2>M1.

Manner 3: Ranges of thresholds configured in the network are the same, but UE at different coverage levels uses different thresholds. For example, a value of neighboring cell measurement based on signal strength is configured as an integer $(0, \ldots, M1)$. UE at the high coverage level may use a step size of N1. A configured neighboring cell measurement trigger threshold may be L1, where L1<M1. In this case, a threshold integer is $L1*N1$ dB, where L1, M1, and N1 are positive integers.

UE at the low coverage level may use a step size of N1. A configured neighboring cell measurement trigger threshold may be L2, where L2<M1. In this case, a threshold integer is $L2*N1$ dB, where L2, M1, and N1 are positive integers, and L2<L1.

The coverage levels may be distinguished in two manners. In one manner, whether a coverage level is high or low is distinguished based on a signal and interference to noise ratio of a synchronization channel or a reference symbol. For example, an SNR or an Es/Iot defined in a standard may be used to distinguish better coverage and poorer coverage. Alternatively, the coverage levels may be distinguished by using signal strength. The signal strength is an indicator similar to an RSRP/NRSRP/MRSRP/RSSI or the like.

The better coverage may include normal coverage, or normal coverage and intermediate coverage, coverage existing when a measurement value of UE is above a coverage distinguishing threshold. The poorer coverage is coverage existing when a measurement value of UE is below the coverage distinguishing threshold.

When there are a plurality of coverage distinguishing thresholds, a plurality of coverage distinguishing intervals such as a good coverage distinguishing interval, an intermediate coverage distinguishing interval, and a poor coverage distinguishing interval may be divided according to a threshold interval.

Based on mobility, the UE in idle mode is divided into a mobile terminal and a non-mobile terminal. A signal strength trigger threshold is used for the mobile terminal, and another signal strength trigger threshold is used for the non-mobile terminal. A neighboring cell measurement trigger threshold of the non-mobile terminal may be less than a neighboring cell measurement trigger threshold of the mobile terminal. The network or the terminal uses a corresponding neighboring cell measurement trigger threshold based on mobility thereof.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" that appears throughput the whole specification does not necessarily mean a same embodiment. Moreover, the particular characteristic, structure or property may be combined in one or more embodiments in any proper manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that this application may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by this application includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In conclusion, what are described above are merely examples of embodiments of the technical solutions of this application, but are not intended to limit the protection scope of this application. Any modification, equivalent replacement, or improvement made without departing from the spirit and principle of this application shall fall within the protection scope of this application.

The invention claimed is:

1. A method comprising:
 obtaining, by a positioning server configured to determine locations of terminal devices, positioning assistance data;
 sending, by the positioning server, at least one positioning assistance data message to a network device, wherein the at least one positioning assistance data message comprises the positioning assistance data, the at least one positioning assistance data message for triggering the network device to broadcast a system message to a terminal device for enabling the terminal device to obtain the positioning assistance data and to perform positioning measurement based on the positioning assistance data;

receiving, by the positioning server after sending the at least one positioning assistance data message to the network device, positioning measurement data from the terminal device; and determining, by the positioning server, a location of the terminal device based on the positioning measurement data.

2. The method according to claim 1, wherein when the positioning assistance data comprises at least two pieces of positioning assistance subdata, sending the at least one positioning assistance data message comprises:

sending a first positioning assistance data message comprising a first piece of the at least two pieces of positioning assistance subdata; and sending a second positioning assistance data message comprising a second piece of the at least two pieces of positioning assistance subdata.

3. The method according to claim 1, wherein obtaining, by the positioning server, the positioning assistance data comprises:

receiving, by the positioning server, the positioning assistance data sent by a real-time kinematic (RTK) positioning server.

4. The method according to claim 3, further comprising:

receiving, by the positioning server, at least one of the following sent by the RTK positioning server:

an identifier of the network device, a cell identifier of the terminal device, an area identifier of the terminal device, a transmission procedure identifier/a service identifier, a quality of service (QoS) requirement of RTK data, and a data transmission rate of the positioning assistance data obtained by the RTK positioning server.

5. The method according to claim 1, wherein the positioning assistance data message is a Long Term Evolution Positioning Protocol A (LPPa) message or a radio technical commission for maritime services (RTCM) message.

6. An apparatus comprising:

a non-transitory memory storage comprising instructions; and one or more processors in communication with the memory storage, wherein the one or more processors execute the instructions to:

obtain positioning assistance data, wherein the apparatus is configured to determine locations of terminal devices;

send at least one positioning assistance data message to a network device, wherein the at least one positioning assistance data message comprises the positioning assistance data, the at least one positioning assistance data message for triggering the network device to broadcast a system message to a terminal device for enabling the terminal device to obtain the positioning assistance data and enabling the terminal device to perform positioning measurement based on the positioning assistance data;

receive, after sending the at least one positioning assistance data message to the network device, positioning measurement data from the terminal device; and determine a location of the terminal device based on the positioning measurement data.

7. The apparatus according to claim 6, wherein the positioning assistance data comprises at least two pieces of positioning assistance subdata, the one or more processors execute the instructions further to:

send a first positioning assistance data message comprising a first piece of the at least two pieces of positioning assistance subdata; and send a second positioning assistance data message comprising a second piece of the at least two pieces of positioning assistance subdata.

8. The apparatus according to claim 6, wherein the one or more processors execute the instructions further to:

receive the positioning assistance data sent by a real-time kinematic (RTK) positioning server.

9. The apparatus according to claim 6, wherein the positioning assistance data message is a Long Term Evolution Positioning Protocol A (LPPa) message or a radio technical commission for maritime services (RTCM) message.

10. The apparatus according to claim 6, wherein the one or more processors execute the instructions further to receive at least one of the following information sent by the RTK positioning server:

an identifier of the network device, a cell identifier of the terminal device, an area identifier of the terminal device, a transmission procedure identifier/a service identifier, a quality of service (QoS) requirement of RTK data, and a data transmission rate of the positioning assistance data obtained by the RTK positioning server.

11. A non-transitory computer readable medium storing program codes for use by a positioning server configured to determine locations of terminal devices, wherein the program codes comprise instructions for:

obtaining positioning assistance data;

sending, by the positioning server, at least one positioning assistance data message to a network device, wherein the at least one positioning assistance data message comprises the positioning assistance data, the at least one positioning assistance data message for triggering the network device to broadcast a system message to a terminal device for enabling the terminal device to obtain the positioning assistance data and enabling the terminal device to perform Positioning measurement based on the positioning assistance data;

receiving, after sending the at least one positioning assistance data message to the network device, positioning measurement data from the terminal device; and determining, a location of the terminal device based on the positioning measurement data.

12. The non-transitory computer readable medium according to claim 11, wherein when the positioning assistance data comprises at least two pieces of positioning assistance subdata, sending the at least one positioning assistance data message comprises:

sending a first positioning assistance data message comprising a first piece of the at least two pieces of positioning assistance subdata; and sending a second positioning assistance data message comprising a second piece of the at least two pieces of positioning assistance subdata.

13. The non-transitory computer readable medium according to claim 11, wherein obtaining the positioning assistance data comprises:

receiving the positioning assistance data sent by a real-time kinematic (RTK) positioning server.

14. The non-transitory computer readable medium according to claim 13, wherein the program codes comprise further instructions for:

receiving at least one of the following information sent by the RTK positioning server:

an identifier of the network device, a cell identifier of the terminal device, an area identifier of the terminal device, a transmission procedure identifier/a service identifier, a quality of service (QoS) requirement of RTK data, and a data transmission rate of the positioning assistance data obtained by the RTK positioning server.

15. The non-transitory computer readable medium according to claim 11, wherein the positioning assistance data message is a Long Term Evolution Positioning Protocol A (LPPa) message or a radio technical commission for maritime services (RTCM) message.

* * * * *